United States Patent [19]

Little et al.

[11] Patent Number: 5,668,900
[45] Date of Patent: Sep. 16, 1997

[54] TAPER SHAPES FOR SIDELOBE SUPPRESSION AND BANDWIDTH MINIMIZATION IN DISTRIBUTED FEEDBACK OPTICAL REFLECTION FILTERS

[75] Inventors: Brent Little, Cambridge, Mass.; Chi Wu, Nepean, Canada

[73] Assignee: Northern Telecom Limited, Montreal, Canada

[21] Appl. No.: 548,304

[22] Filed: Nov. 1, 1995

[51] Int. Cl.$^6$ .................... G02B 6/34; H01S 3/08
[52] U.S. Cl. .................... 385/37; 385/9; 385/10; 385/14; 385/42; 385/43; 385/131; 385/30; 372/43; 372/96; 372/102
[58] Field of Search .................... 385/31, 37, 43, 385/41, 42, 14, 15, 131, 9, 10, 28, 30; 372/43, 50, 96, 102

[56] References Cited

U.S. PATENT DOCUMENTS 4,573,163  2/1986  Kaminow .................... 372/96
4,750,801  6/1988  Alferness .................... 385/37 X (List continued on next page.)

OTHER PUBLICATIONS

Kogelnik et al., "Filter Response of Nonuniform Almost--Periodic Structures", The Bell System Technical Journal, vol. 55, No. 1, p. 109–126, (1976).

(List continued on next page.)

*Primary Examiner*—Brian Healy
*Attorney, Agent, or Firm*—Foley & Lardner

[57] ABSTRACT

Improvements in distributed feedback optical reflection filters are described. In particular, taper shapes for the optical reflection couplers are determined by a design method based on a variational optimization theory, to provide an out-of-band sidelobe suppression ratio of greater than −30 dB, and a reduced width of the filtered bandwidth for a specified side lobe suppression level. These filter characteristics were determined by specifying the interaction strength reflection function along the length of the coupler, by the design formula $$K_S(z) = L_o(z) + S L_1(z) + S^2 L_2(z) + S^3 L_3(z)$$

where $K_S(z)$ is the interaction strength; S is the desired sidelobe level in |dB| $L_i(z)$ (i=0,1,2,3) are functions of the propagation distance z.

The functions $L_i(z)$ are given by:

$$L_i(z) = \frac{4}{L_c} \sum_{j=1}^{6} b_{i,j} \cos\left( (2j-1)\pi \frac{z}{L_c} \right).$$

where $L_c$ is the physical length of the coupler, and the set of constant coefficients $b_{i,j}$ are given by:

| | j | | | |
|---|---|---|---|---|
| $b_{i,j}$ | 1 | 2 | 3 | 4 |
| $b_{0,j}$ | 1.316 | −0.4430 | 2.839e-1 | −1.902e-1 |
| $b_{1,j}$ | 1.308e-2 | 1.906e-2 | −1.778e-2 | 1.229e-2 |
| $b_{2,j}$ | −1.540e-4 | −1.136e-4 | 2.736e-4 | −2.359e-4 |
| $b_{3,j}$ | 7.10e-7 | 1.541e-7 | −1.397e-6 | 1.414e-6 |

| | j | |
|---|---|---|
| $b_{i,j}$ | 5 | 6 |
| $b_{0,j}$ | 1.337e-1 | −9.33e-2 |
| $b_{1,j}$ | −8.188e-3 | 5.436e-3 |
| $b_{2,j}$ | 1.615e-4 | −1.048e-4 |
| $b_{3,j}$ | 1.0279e-6 | 6.680e-7 |

In practice, the specified interaction strength is produced by modulating one of the physical parameters of the DFB filter for example, the vertical depth of horizontal width of corrugations of the reflection grating; the index contrast ratio; the duty cycle of the reflection grating; or by defining the on-off sample rate of the grating corrugations.

8 Claims, 21 Drawing Sheets

Multilayer DFB Coupler

U.S. PATENT DOCUMENTS

| | | | |
|---|---|---|---|
| 5,091,916 | 2/1992 | Cimini, Jr. et al. | 372/96 |
| 5,311,539 | 5/1994 | Behfar-Rad et al. | 372/96 |
| 5,345,466 | 9/1994 | Macomber | 372/96 |
| 5,517,589 | 5/1996 | Takeuchi | 385/24 |

OTHER PUBLICATIONS

Alferness et al., "Filter Characteristics of Codirectionally Coupled Waveguides with Weighted Coupling", IEEE Journal of Quantum Electronics vol. QW–14, No. 11, pp. 843–847, Nov. 1978.

Alferness, "Optical directional couplers with weighted coupling", Appl. Phys. letters 35(3), pp. 260–263, Aug. 1, 1979.

Song et al., "Design of corrugated waveguide filters by the Gel'fand–Levitan–Marchenko inversescattering method", Optics Letters vol. 2, No. 11, pp. 1905–1915, Nov. 1985.

Little et al., "Synthesis of codirectional couplers with ultralow sidelobes and minimum bandwidth", Optics Letters, vol. 20, No. 11, pp. 1259–1261, Jun. 1, 1995.

Sakata, "Sidelobe suppression in grating–assisted wavelength–selective couplers", Optics Letters, vol. 17, No. 7, pp. 463–465, Apr. 1, 1992.

Song, "Proposal for acousto–optic tunable filters with near–ideal bandpass characteristics", Applied Optics, vol. 33, No. 25, pp. 1–3, 1994.

Winick, "Design of Grating–Assisted Waveguide couplers with Weighted Coupling", Journal of Lightwave Technology, vol. 9, No. 11, pp. 1481–1492, Nov. 1991.

Haus et al., "Coupled–Mode Theory of Optical Waveguides", Journal of Lightwave Technology, vol. LT–5, No. 1, pp. 16–23, Jan. 1987.

Rib Waveguide Coupler

Vertical Waveguide Coupler

Distributed Feedback Coupler

Codirectional Coupler

High Index ↓   Low Index ↓

Planar DFB

Vertical Grating DFB

Substrate Grating DFB

Horizontal Grating DFB

Fibre Grating DFB

Multilayer DFB Coupler

Multiple Feedback Reflections in a DFB

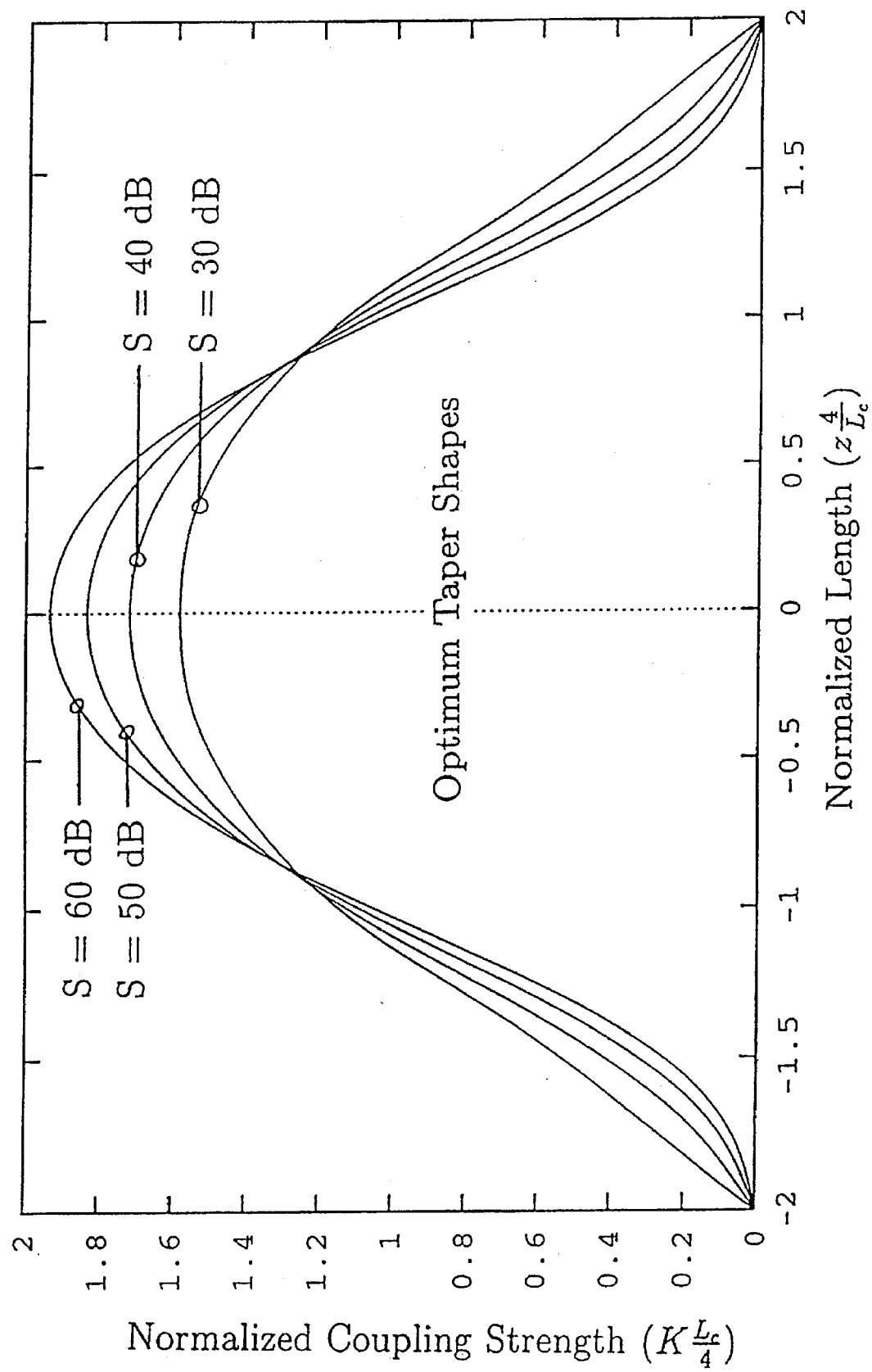

Modulation of Grating Height or Width

Modulation of Duty Cycle

Modulation of Index Contrast

Sampled Grating Modulation

TAPER SHAPES FOR SIDELOBE SUPPRESSION AND BANDWIDTH MINIMIZATION IN DISTRIBUTED FEEDBACK OPTICAL REFLECTION FILTERS

FIELD OF INVENTION

This invention relates to a distributed feedback (DFB) optical reflection filters, and more particularly to taper shapes for bandwidth minimization and sidelobe suppression in DFB optical reflection filters.

BACKGROUND OF THE INVENTION

The potential communication capacity of optical fibers operating in the low loss wavelength windows of 1.3 μm and 1.5 μm is in the order of tens of Terahertz. The practical utilization of this bandwidth my be realized through the use of wavelength division multiplexing (WDM), in which the spectral range is subdivided and allocated to different carrier wavelengths (channels) which are multiplexed onto the same fiber. The frequency bandwidth that an individual channel occupies depends on a number of factors, including the impressed modulation bandwidth, margins to accommodate for carrier frequency drift, carrier frequency uncertainty, and to reduce cross-talk between channels.

Although an isolated optical fiber may inherently have tremendous information carrying capacity, the overall optical communication link may be significantly restricted in bandwidth. These restrictions may result from the limited optical amplifier spectral windows, the availability of lasing sources and their tuning ranges, and filter tuning ranges. Hence, to achieve efficient use of bandwidth requires that the available communications windows be densely filled with multiplexed channels. At the input and output of such a system, filters are needed to combine and separate wavelengths in individual channels. The performance of these wavelength filters, in their ability to filter one channel and reject out of band signals, is critical in determining channel spacing and hence channel density for WDM communications.

An ideal filter response is a "box" or "window" function, characterized by unity filtering of the wavelength band of interest, and zero transmission of signals outside of the band. The bandwidth of each channel ideally is made as narrow as possible, to accommodate a larger number of channels.

Filters may be subdivided into two very broad categories, reflection type and transmission type.

In the reflection type the wavelength of interest is coupled from a forward travelling wave into a backward travelling wave, i.e. is reflected back in the direction from which it came, either into the same waveguide or into another waveguide. Particular types of reflection filters include, for example, a distributed Bragg reflector (DBR), a distributed feedback (DFB) reflector, and a contra-directional coupler.

The transmission type of filters on the other hand include for example a co-directional coupler, grating assisted coupler, and Mach Zehnder filter, which couple energy between two waves or modes travelling in the same directions.

Filters operate through a wavelength dependent exchange of power between two waveguide modes. It is well known that two waveguides placed in close proximity may exchange power through their evanescent fields, which penetrate the guiding layer of the other waveguide. This power exchange occurs continuously along the propagation direction, with a rate determined by the inter-waveguide spacing, and the degree of velocity matching of the two modes.

For co-directional couplers comprising two parallel waveguides, and for the case of a uniform coupling coefficient along the interaction length, the transfer function is approximately given by a $[\sin(\chi)/\chi]^2$ function, with symmetric first sidelobes of −9 dB. This level of sidelobe suppression allows for significant cross talk between channels and provides unacceptable wavelength selectivity for current communications applications.

Codirectional couplers are modeled conventionally through a set of coupled mode differential equations written in general form, such as:

$$\frac{dA_1}{dz} = -jKe^{-j\Delta\beta z}A_2 \qquad \text{Equation (1a)}$$

$$\frac{dA_2}{dz} = -jKe^{j\Delta\beta z}A_1 \qquad \text{Equation (1b)}$$

where $A_1$ and $A_2$ represent the amplitudes of the two waveguide modes at position z in the coupler. $\Delta\beta$ is the detuning constant and K is the coupling strength. K depends on the waveguide structure and is strongly influenced by the separation of adjacent waveguides. The origin of coupling may be due to interaction of evanescent fields in a codirectional coupler, or by coherent scattering in a grating assisted coupler. By varying the interaction strength K along the coupler the spectral response of the device can be improved. Thus by a suitable choice of function K(z) it is theoretically possible to generate a desired filter response. The calculation of the taper shape required for a desired response has been a long-standing design question.

For example, an original proposal was based on an approximate Fourier transform relation, described by Alferness et al., in IEEE J. Quantum Electronics QE 14(11) pp. 843–847, November 1978. Improved optical waveguide directional couplers were suggested for which the coupling strength is weighted, or tapered, along the interaction length by several known taper functions. For example, in two co-directional waveguides, the inter-guide separation may be varied along the interaction length. In an article in Appl. Phys. Letters 35(3), pp. 260–263, 1 Aug. 1979, Alferness demonstrated experimentally the feasibility of using weighted coupling to reduce sidelobes of the filter transfer response, allowing for closer stacking of wavelength channels with reduced cross talk by use of various taper profiles. In particular, a Hamming taper function was found to provide −25 dB transfer response sidelobes, a significant improvement over other known taper functions, for example, a raised cosine function, Blackman taper, and Kaiser taper function.

The goal of filter synthesis is to solve for the coupling constant function K(z) given a desired response for $A_1$ and $A_2$. However, when K(z) is non-constant, the set of coupled equations (1a) and (1b) has no analytic solution in general. Hence, filter design is currently guided by a set of approximate solutions.

The most important of these approximate solutions is obtained by the Fourier transform relation, given by:

$$A_2(\Delta\beta) = \int K(z) e^{-j\Delta\beta z} dz \qquad \text{Equation (2)}$$

In Equation (2), $A_2(\Delta\beta)$ is the amplitude in the output or coupled waveguide as a function of detuning $\Delta\beta$, (which may be related to the actual wavelength λ). Because Equation (2) represents a Fourier transform relation between K(z)

in the spatial domain and $A_2(\Delta\beta)$ in the wavelength domain, the principle of duality may be used. That is, given a desired $A_2(\Delta\beta)$, $K(z)$ is found by the inverse Fourier transform. This approximation is valid for small coupling values, and does not extend to describe the critical region of the main passband and first few sidelobes. No analytic solution currently treats the important region around the central wavelength.

On the other hand, inverse scattering methods are mathematically rigorous. Given a desired response $A_2(\Delta\beta)$, the inverse scattering method attempts to numerically solve the coupled mode equations in an inverse sense, thus yielding the desired interaction function $K(z)$. The success of the inversion depends on being able to specify the desired response as a rational function, and is therefore limited to those functions which fall under this category. Moreover, the interaction strength solution is defined on the entire z axis $\{-\infty<z<\infty\}$. Thus one must arbitrarily truncate the range of $K(z)$ to get a coupler of finite length. This truncation can seriously degrade performance, as discussed in an article of Song et al., entitled "Design of corrugated waveguide filters by the Gel'fand-Levitan-Machenko inverse scattering method." in J. Opt. Soc. Am. A. Vol.2 (11), pp. 1905–1915, 1985.

The inverse scattering method does not yield any guidelines on how to obtain the desired response in a coupler with a specified and finite length. Thus, it can never, in a rigorous sense, yield the ideal solution of $K(z)$ for a practical device. Indeed, no known finite taper function $K(z)$ has yet been shown to meet the required optical communication specifications. Thus alternative approaches are required for filter design.

Consequently, as described in the above mentioned co-pending U.S. patent application Ser. No. 08/385,419 to the current inventors, entitled "Taper shapes for ultra-low sidelobe levels in directional coupler filters", a novel approach to filter design was developed based on a variational optimization theory and a publication in Optics Letters, vol. 20 (11) pp. 1259–1261, 1 Jun. 1995. By this approach, a new class of coupler shape functions was synthesized and their application was demonstrated in deriving taper functions for co-directional coupler filters, in which:

$$\kappa(z)=L_o(z)+SL_1(z)+S^2L_2(z)+S^3L_3(z)+S^4L_4(z) \qquad \text{Equation (3)}$$

where $\kappa(z)$ is the normalized interaction strength, S is the desired sidelobe level, and where $L_i$ are given by $$L_i(z) = \sum_{j=1}^{6} b_{i,j}\cos((2j-1)\pi z) \quad (-0.5<z<0.5) \qquad \text{Equation (4)}$$

and where for a real physical device, the physical length scales as $Z=sL_c$, where Z is the physical length, z is the normalized length, and $L_c$ is the length of the interaction region of the device. Thus $L_i$ are functions of the propagation distance z only. It was demonstrated that sidelobe suppression of the transfer function from $-40$ dB to $-75$ dB can be obtained, with bandwidths within 5% of the theoretical minimum bandwidths, may be obtained for co-directional couplers.

Another type of coupled waveguide filters are known as grating assisted codirectional couplers is discussed in detail in another copending patent application to the present inventors, entitled "Taper shapes for sidelobe suppression and bandwidth minimization in distributed feedback optical reflection filters", to be filed concurrently herewith. In these devices, power exchange occurs due to coherent scattering by a periodic grating placed in proximity to the two waveguides. In an article by Sakata, on wavelength selective grating assisted couplers, in Optics Letters, Vol. 17(7) 1 Apr. 1992 pp. 463–465, improved sidelobe suppression was obtained by controlling the duty ratio of grating assisted vertically coupled waveguides, using a truncated Gaussian taper function. Sidelobe suppression in grating assisted wavelength selective couplers of Sakata showed that required grating periods were sufficiently coarse (~µm) to allow for fabrication by known conventional photolithography and etching process. It was also shown that a Hamming taper offered narrower bandwidth spacing, while a Kaiser taper provided improved sidelobe suppression below $-60$ dB. Thus, in comparing the Hamming, Blackman, Kaiser, and truncated Gaussian taper functions, the trade off between multiplexing density and cross-talk level was demonstrated.

Nevertheless, reflection filters exhibit distinctly different types of wavelength filter response, or spectral response, from transmission filters.

Reflection filters are characterized by having a much narrower bandwidth than transmission filters, which is an advantage for densely spaced optical channels. A reflection filter is also characterized by what is called a "stopband", that is a wavelength range or window where all wavelengths exhibit strong reflection, and are stopped from being transmitted through the device. Thus the spectral response of a reflection filter is closer to an ideal 'box' function. On the other hand, reflection filters tend to have much larger sidelobes outside the stopband range of wavelengths, which are troublesome for cross talk. Sidelobe suppression to a level of at least $-30$ dB to $-60$ dB is desirable for current communications applications, to reduce cross-talk to an acceptable level. Improved taper functions for reflection filters are required to provide the desired level of sidelobe suppression with a minimum bandwidth.

SUMMARY OF THE INVENTION

Thus the present invention seeks to provide a distributed feedback optical reflection filter with improved passband response and sidelobe suppression, and in particular seeks to provide improved tapers shapes for DFB reflection filters providing a specified sidelobe suppression with near minimum bandwidth.

Thus according to one aspect of the present invention there is provided a distributed feedback optical reflection filter coupler wherein the taper shapes determining the interaction strength as a function of distance z of the device are determined by a design method based on a variational optimization theory, to provide an interaction strength reflection function having an out-of-band sidelobe suppression ratio of greater than $-30$ dB, and a minimum width of the filtered bandwidth for a specified side lobe suppression level.

Thus a design approach based on the variational optimization theory is shown to provide taper functions for improved performance for optical reflection filters, particularly DFB reflection filters, which optimize the passband and sidelobe suppression, for example for applications in optical communications.

In accordance with another aspect of the present invention there is provided a distributed feedback optical reflection filter coupler wherein the interaction strength reflection function along the length z of the coupler, is specified by the design:

$$K_S(z)=L_o(z)+SL_1(z)+S^2L_2(z)+S^3L_3(z)$$

where $K_S(z)$ is the normalized interaction strength along the propagation direction, S is the desired sidelobe level in |dB|, $L_i(z)$ (i=0,1,2,3) are functions of the propagation distance z, and the functions $L_i(z)$ are given by $$L_i(z) = \frac{4}{L_c} \sum_{j=1}^{6} b_{i,j} \cos\left((2j-1)\pi \frac{z}{L_c}\right).$$

where $L_c$ is the physical length of the coupler, and the set of constant coefficients $b_{i,j}$ are given by

| $b_{i,j}$ | 1 | 2 | 3 | 4 | 5 | 6 |
|---|---|---|---|---|---|---|
| $b_{0,j}$ | 1.316 | −0.4430 | 2.839e-1 | −1.902e-1 | 1.337e-1 | −9.33e-2 |
| $b_{1,j}$ | 1.308e-2 | 1.906e-2 | −1.778e-2 | 1.229e-2 | −8.188e-3 | 5.436e-3 |
| $b_{2,j}$ | −1.540e-4 | −1.136e-4 | 2.736e-4 | −2.359e-4 | 1.615e-4 | −1.048e-4 |
| $b_{3,j}$ | 7.10e-7 | 1.541e-7 | −1.397e-6 | 1.414e-6 | 1.0279e-6 | 6.680e-7 |

Thus, an interaction strength function $K_S(z)$ for a DFB optical reflection filter having an optimized bandwidth for a specified level of sidelobe suppression is provided.

The interaction strength function is given in the form of an analytic function having sets of constant coefficients, which are defined to provide an optimized filter response.

Practically, a DFB optical reflection filter comprises a reflection grating having a vertically corrugation depth, and the specified interaction strength $K_S(z)$ is produced by modulation of the vertical corrugation depth of the reflection grating in accordance with the required interaction strength function. Alternatively the filter comprises a reflection grating having a horizontal corrugation width, and the specified interaction strength $K_S(z)$ is produced by modulation of the corrugation width of the reflection grating. In other DFB optical reflection filters, other physical parameters of the grating are modulated to provide the specified interaction strength $K_S(z)$, e.g. the duty cycle of the grating, the on-off sample rate of the grating, or an index modulation grating having high index and low index regions with modulation of the high and low index contrast.

Thus the taper functions are implemented in DFB reflection filter couplers fabricated by known methods by varying a physical parameter of the device in accordance with the interaction function of the invention, for example in DFB reflection filters fabricated by either optical holography or E beam writing.

BRIEF DESCRIPTION OF THE DRAWINGS

Embodiments of the invention will now be described by way of example, with reference to the accompanying drawings, in which:

FIG. 1a shows a vertically coupled grating coupler with a grating on top of the waveguide; FIG. 1b shows a rib waveguide coupler with a surface corrugation grating on one waveguide; and FIG. 1c shows a rib or ridge waveguide coupler with a grating disposed between the two waveguides;

FIG. 2a shows a distributed feed back coupler as an example of a reflection filter; FIG. 2b shows a codirectional coupler as an example of a transmission filter;

FIG. 3a shows the reflection filter response of the DFB coupler shown in FIG. 2a; FIG. 3b shows the transmission filter response of the codirectional coupler shown in FIG. 2b, with the ordinate in units of universal normalized detuning (radians);

FIG. 4c shows a stack of planar dielectric layers for reflecting large diameter optical beams; FIG. 4c shows a ridge waveguide comprising a grating in the substrate layer; FIG. 4c shows a ridge waveguide with a grating etched vertically into the ridge; FIG. 4c shows a ridge waveguide with a grating etched horizontally into the ridge; FIG. 4e shows an optical fiber with an etched or deposited grating on the core or cladding;

FIG. 7a shows the reflected power in a linear scale showing the box-like central stopband and large sidelobes; FIG. 7b shows the same reflected power on a logarithmic (dB) scale, showing the slow decay of sidelobe levels away from the stopband;

FIG. 8 shows the normalized taper shape functions $\kappa_S(z)$ giving the optimum filter response $\kappa_S(z)$ for reflection filters according to embodiments of the present invention for the four representative cases of sidelobe suppression S=30, 40, 50 and 60 as marked;

DESCRIPTION OF THE PREFERRED EMBODIMENTS

Figure 1B:
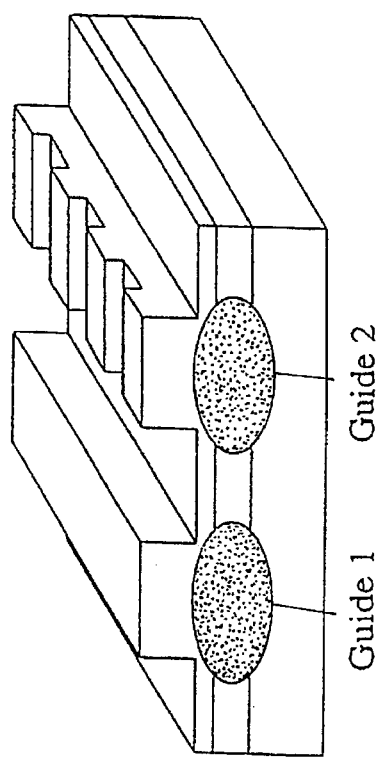
FIG. 1a, 1b and 1c shows three known types of grating assisted codirectional couplers.
Figure 1A:
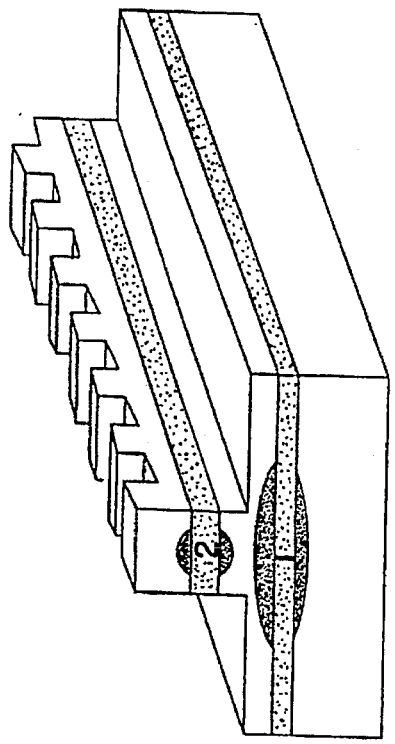
Figure 1C:
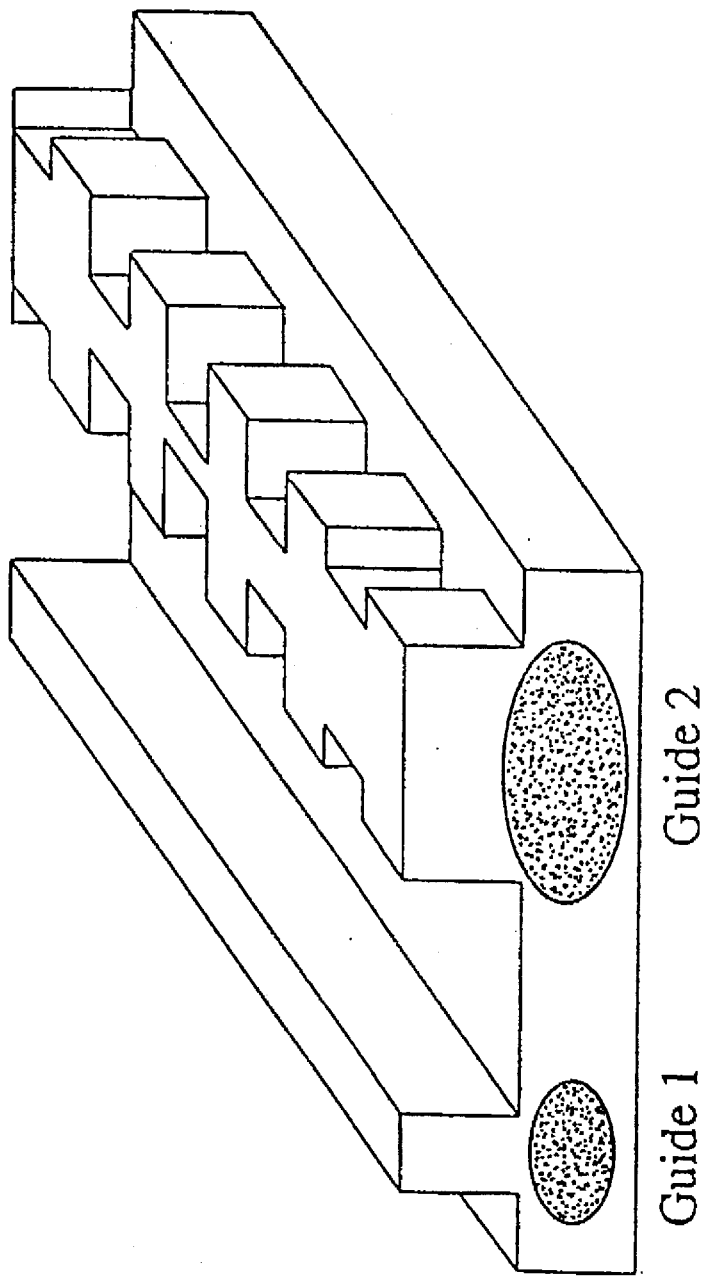

Three known types of conventional grating assisted codirectional couplers are shown in FIGS. 1a to 1c: FIG. 1a shows a vertically coupled grating coupler with a grating on top of the waveguide; FIG. 1b shows a rib waveguide coupler with a surface corrugation grating on one waveguide; FIG. 1c shows a rib, or ridge, waveguide coupler with a grating placed in between the two waveguides.

Figure 2A:
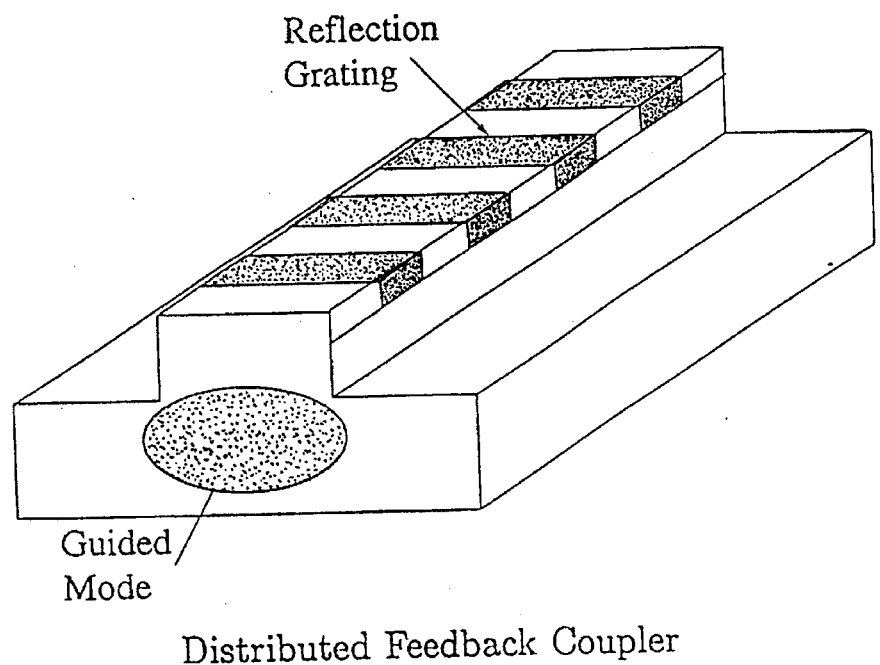
FIGS. 2a and 2b shows two classes of conventional known coupler filters.
Figure 2B:
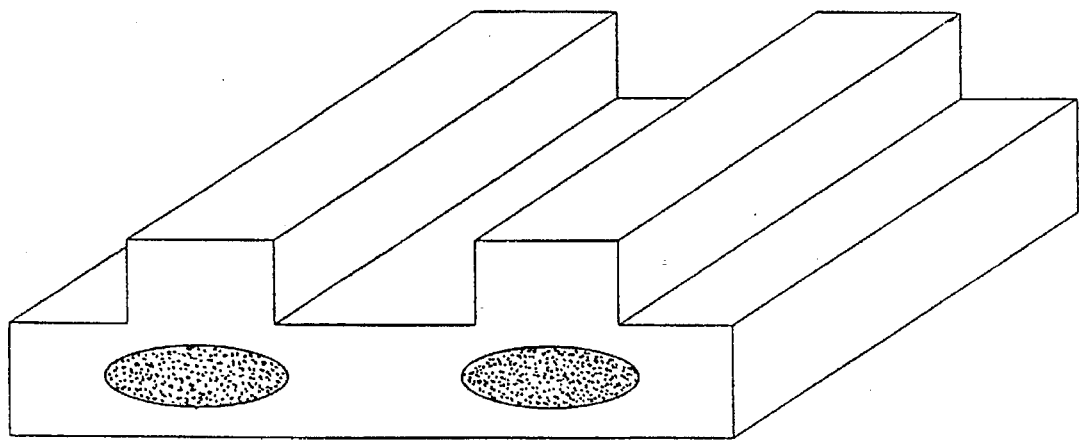

Examples of two classes of coupler filters are shown in FIG. 2a and 2b. As an example of a reflection filter, a conventional type of distributed feedback coupler is shown in FIG. 2a. As an example of a transmission coupler, a conventional co-directional coupler is shown for comparison in FIG. 2b.

Figure 3A:
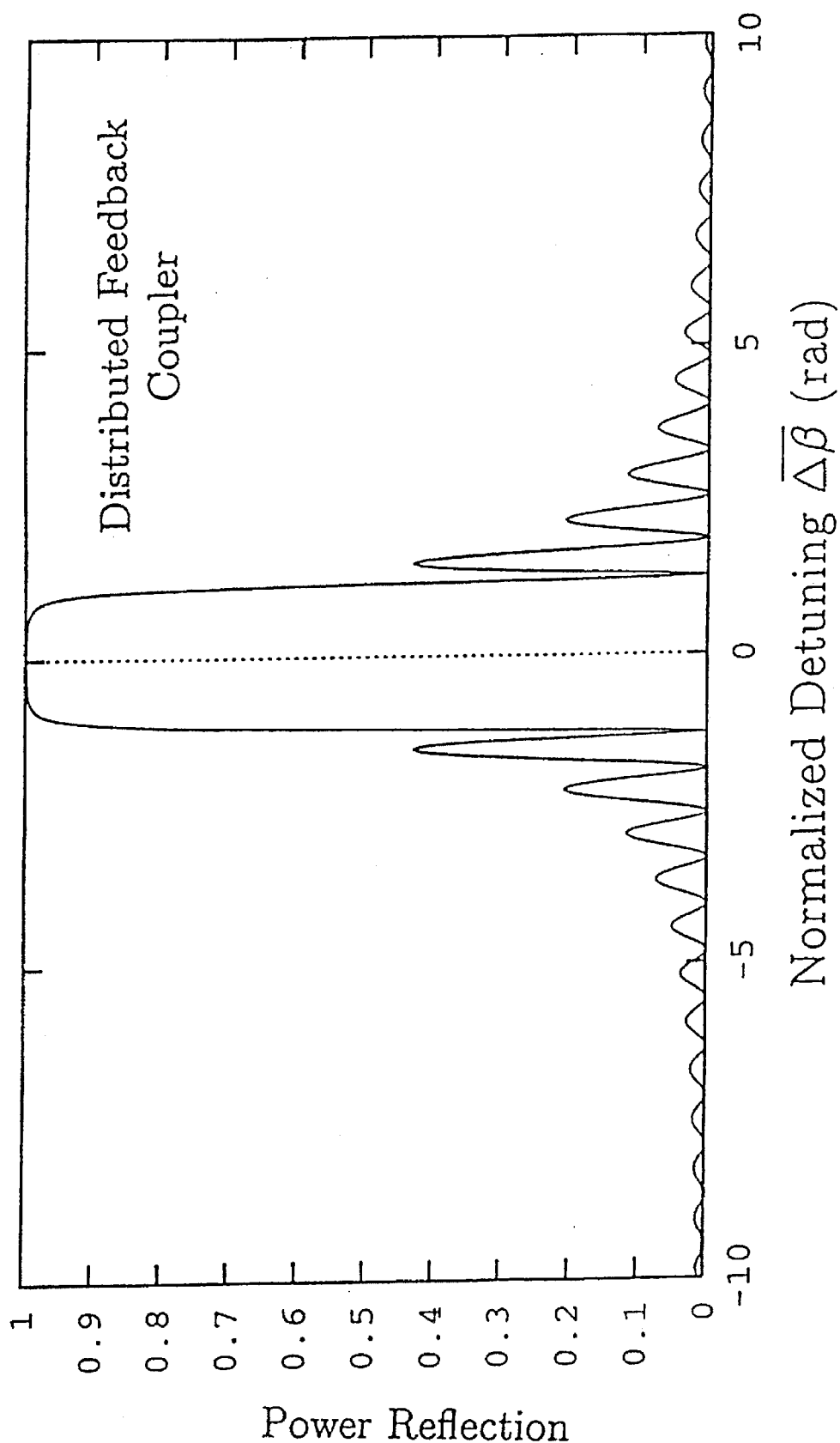
FIGS. 3a and 3b show a typical filter response ("spectral response") for each of the two classes of filters, i.e.
Figure 3B:
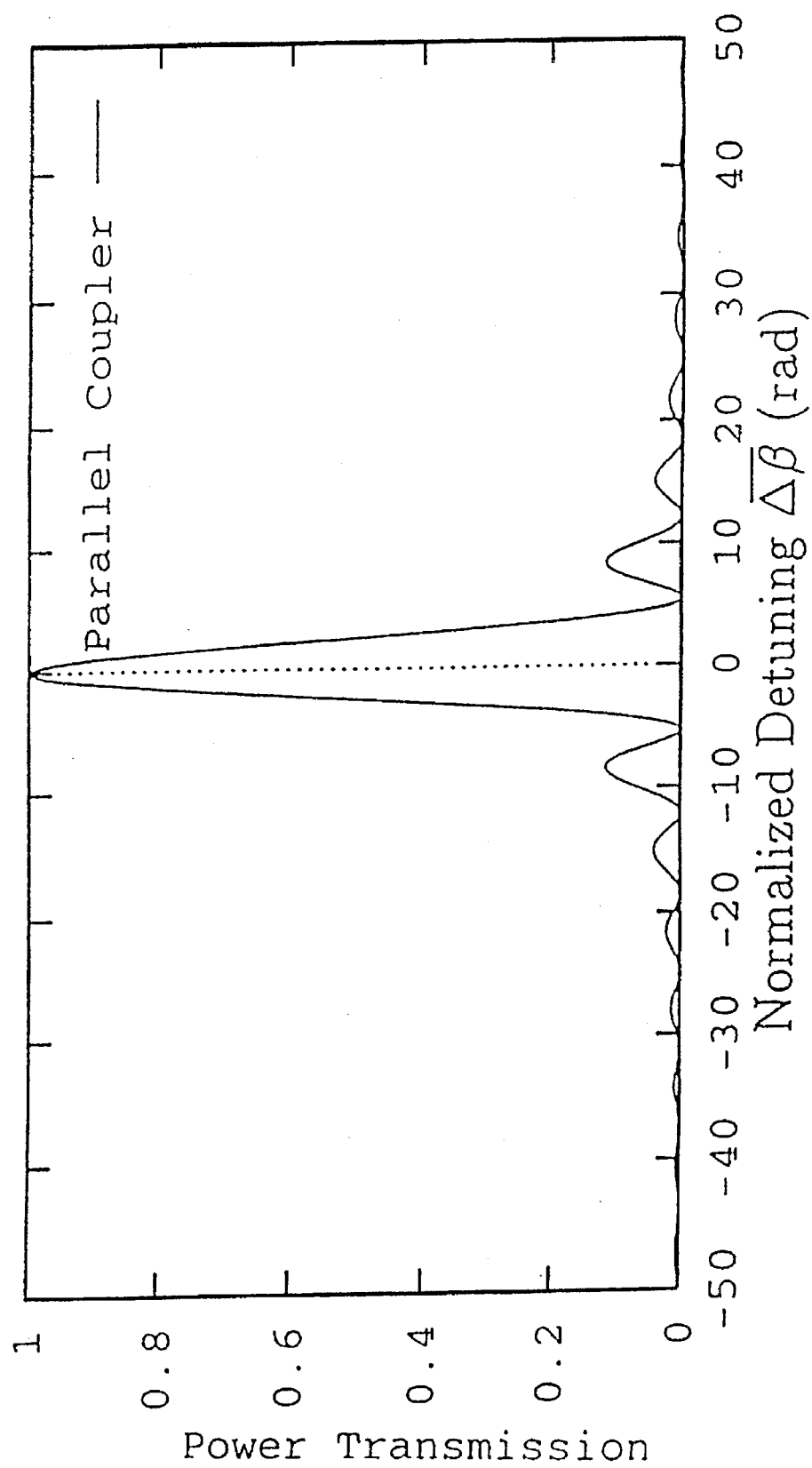

Typical known filter responses of these two classes of filters is shown in FIGS. 3a and 3b, which show the filter response of the filters of FIGS. 2a and 2b respectively, and show the sidelobes of the filter response which cause cross talk with neighbouring channels.

Figure 4A:
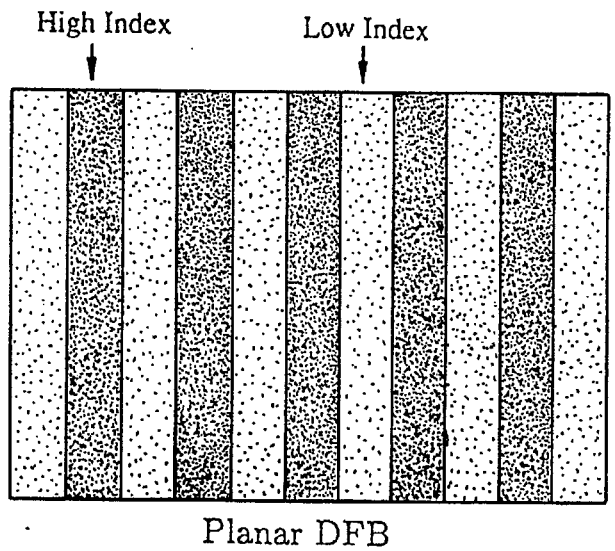
FIGS. 4a, 4b, 4c, 4d, and 4e show five known types of devices used for distributed feedback coupling.

Several known types of reflection filters of interest in the present application are shown schematically in FIGS. 4a to 4e. A planar filter with large transverse dimensions is shown in FIG. 4a. It comprises a stack of alternating layers of high and low refractive index materials used for forming a periodic grating and is used to reflect large diameter light waves that are essentially plane waves.

Figure 4B:
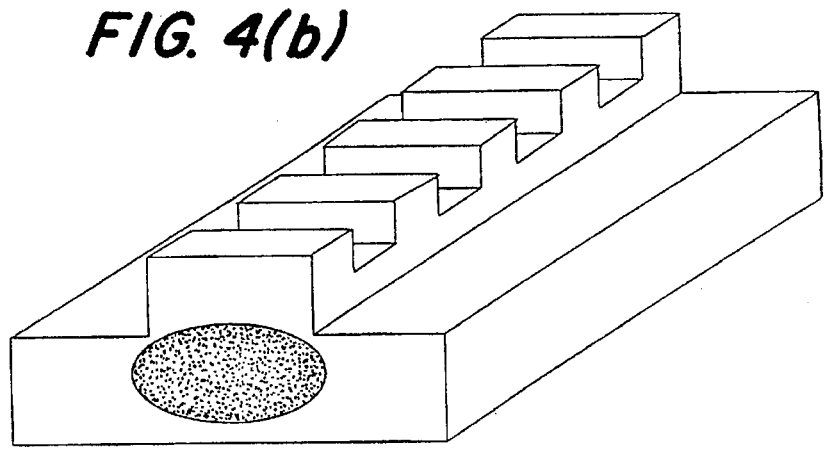
Figure 4C:
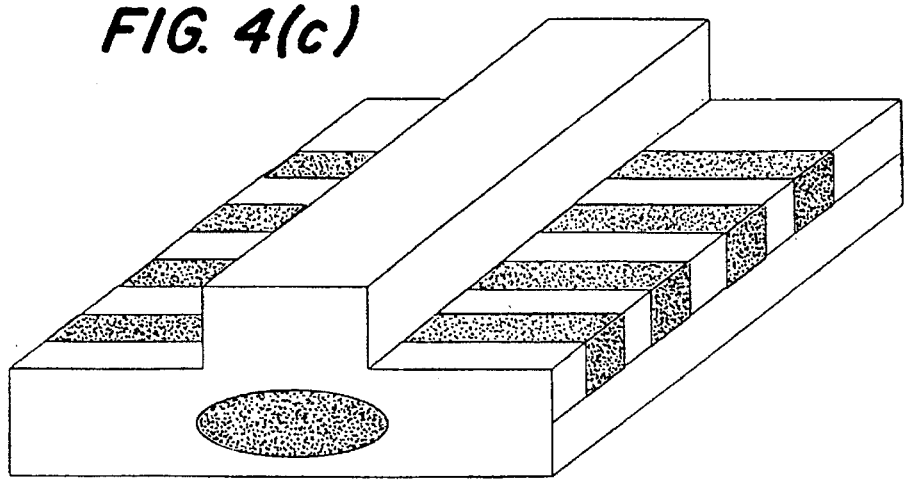

A DFB filter formed in a ridge waveguide known as a vertical grating DFB filter is shown in FIG. 4b. The reflection grating is a surface corrugation defined in the top surface of the ridge. Alternatively, as shown in FIG. 4c, a grating is defined in a substrate layer of the ridge waveguide.

Figure 4D:
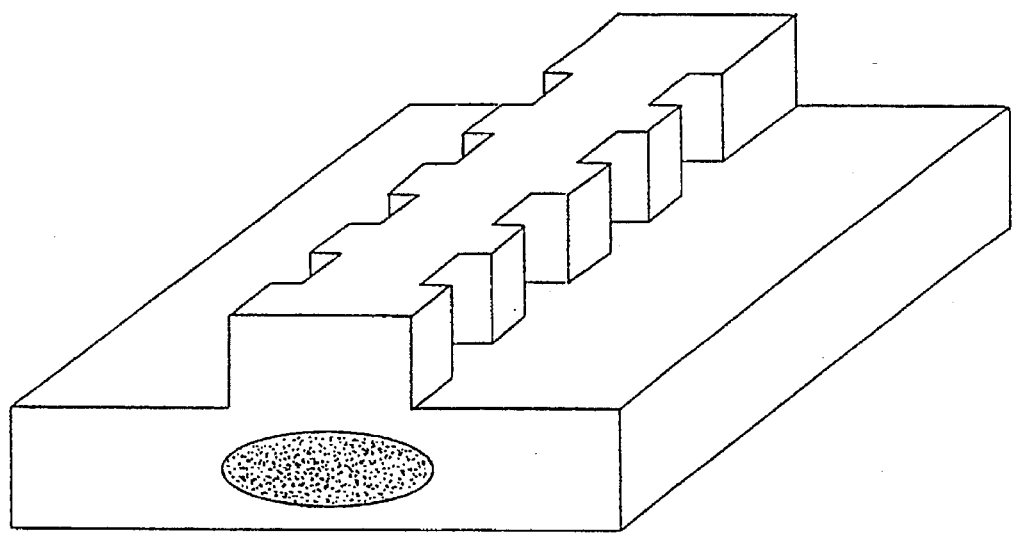
Figure 4E:
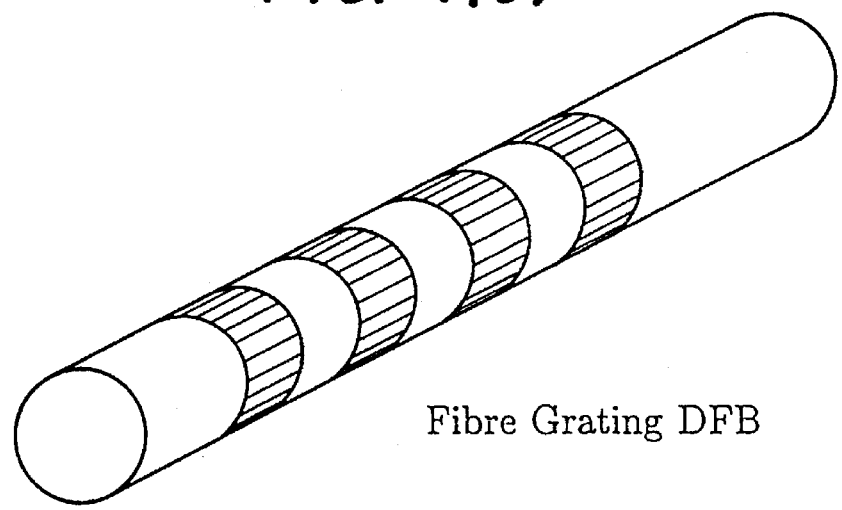

Another alternative configuration comprises a grating etched horizontally in the ridge as shown in FIG. 4d. A grating defined in an optical fiber, which is of particular interest for optical fiber communications applications, is shown in FIG. 4e.

Figure 5:
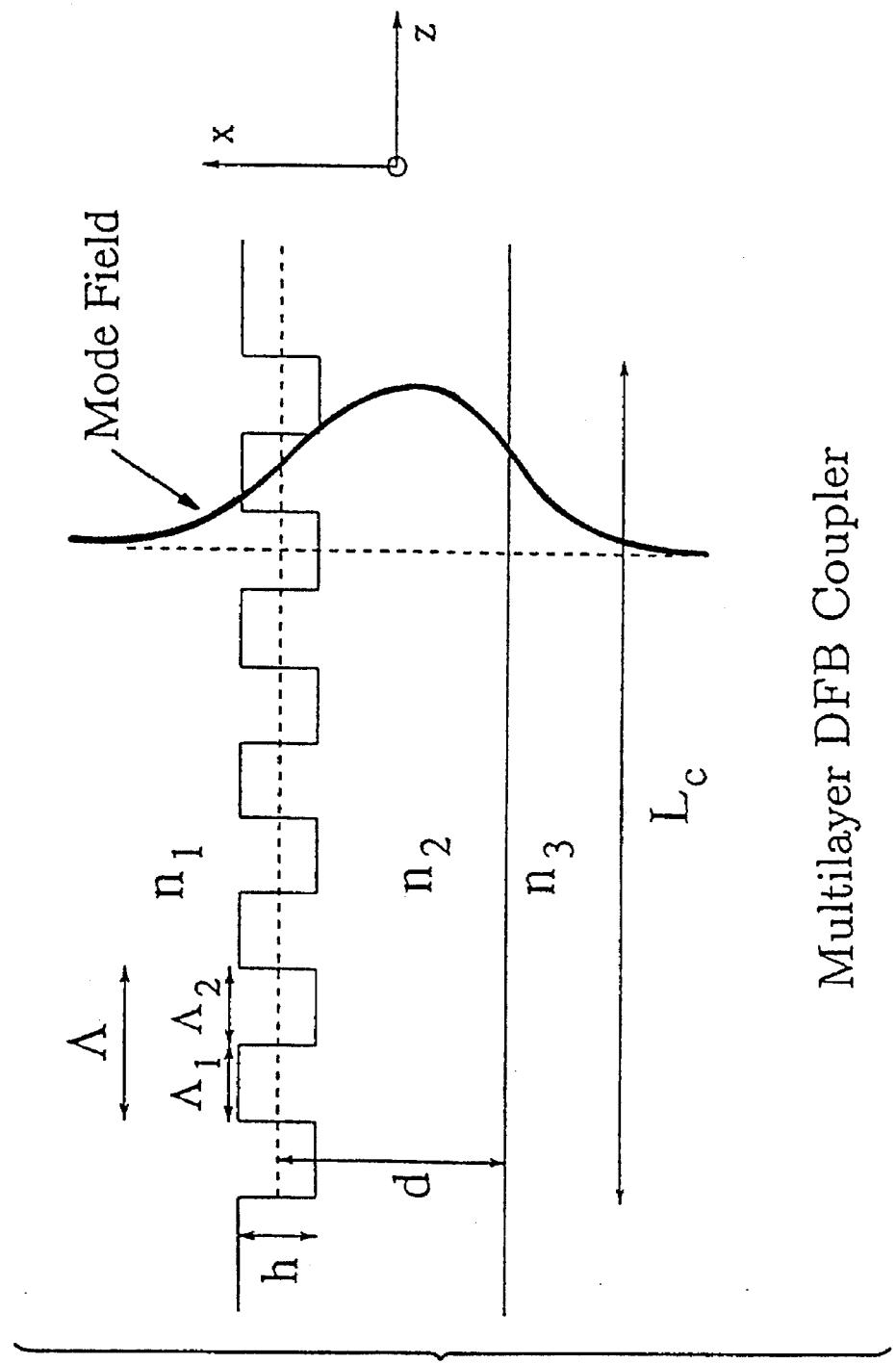
FIG. 5 shows a general schematic two dimensional representation of the three dimensional waveguides depicted in FIGS. 4a to 4e.

In the following descriptions, the 3 dimensional grating couplers of the types shown in FIGS. 4a to 4e will be represented schematically in two dimensions as shown in FIG. 5. The schematic periodic grating shown in FIG. 5 is represented as a surface type, although it may alternatively be an index type. The index values of the 3 layer waveguide in FIG. 5 are $n_1$, $n_2$ and $n_3$, with $n_2$ being the index of the waveguiding layer. The core layer has a mean thickness of d, and the grating has a total depth of h. The period of the grating is designated $\Lambda$. The lengths of high and low index portions forming the grating are designated $\Lambda_1$ and $\Lambda_2$ and $\Lambda_1+\Lambda_2=\Lambda$. The grating duty cycle is defined as the ratio of high index length to overall length of the grating. That is, the duty cycle is $\Lambda_1/\Lambda$. Thus, a square grating has a duty cycle of 0.5 (50%). The spatial frequency of the grating is given by $\Omega$ where $\Omega=2\pi/\Lambda$.

Figure 6:
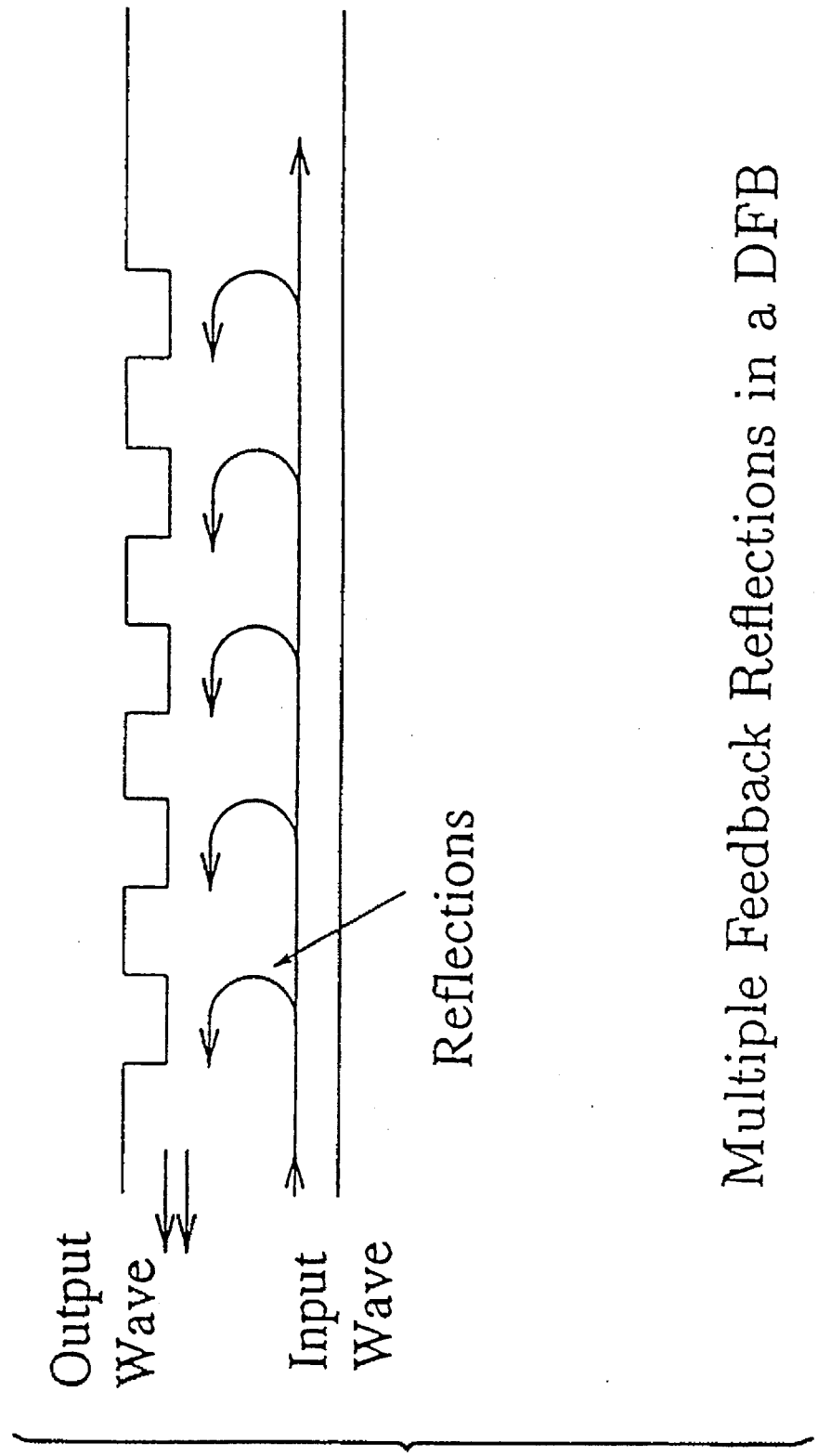
FIG. 6 shows a schematic diagram of the conceptual principle of distributed feedback coupling.

The function of the grating is to reflect or couple power from a forward propagating mode into a backward propagating mode. At each individual grating period, a small reflection occurs, as shown schematically in FIG. 6. The overall or net backward propagating mode is due to the sum of all the small reflections occurring along the length of the device, hence the name "distributed feedback coupler".

To generate a large net reflected wave propagating in the backward direction in a DFB coupler the individual small reflections from all the grating segments must add in a coherent manner. For the reflections to add constructively, the period of the grating must be appropriately selected: this condition leads to the grating period being $$\Lambda = \frac{\pi}{\beta(\lambda_o)} \qquad \text{Equation (5)}$$

where $\Lambda$ is the grating period (see FIG. 5), $\beta$ is the propagation constant of the mode, and $\lambda_o$ is the central wavelength of the design. When the condition of equation (5) is satisfied, the condition is called resonance or phase matched.

Wavelength selectivity in the distributed feedback coupler occurs because at wavelengths $\lambda$ other than $\lambda_o$, $\beta(\lambda)$ is different from $\beta(\lambda_o)$ and condition of equation (5) is not satisfied, so that distributed reflections add destructively and the optical power is transmitted through the device, rather than reflected. As the wavelength moves farther from $\lambda_o$, the reflected mode power becomes smaller. The device therefore preferentially filters wavelengths near $\lambda_o$. However, there are certain sub-resonances which occur for wavelengths other than $\lambda_o$. These sub-resonances allow considerable but not complete conversion of an input mode into a reflected mode. These resonances produce what are called the sidelobes.

Figure 7A:
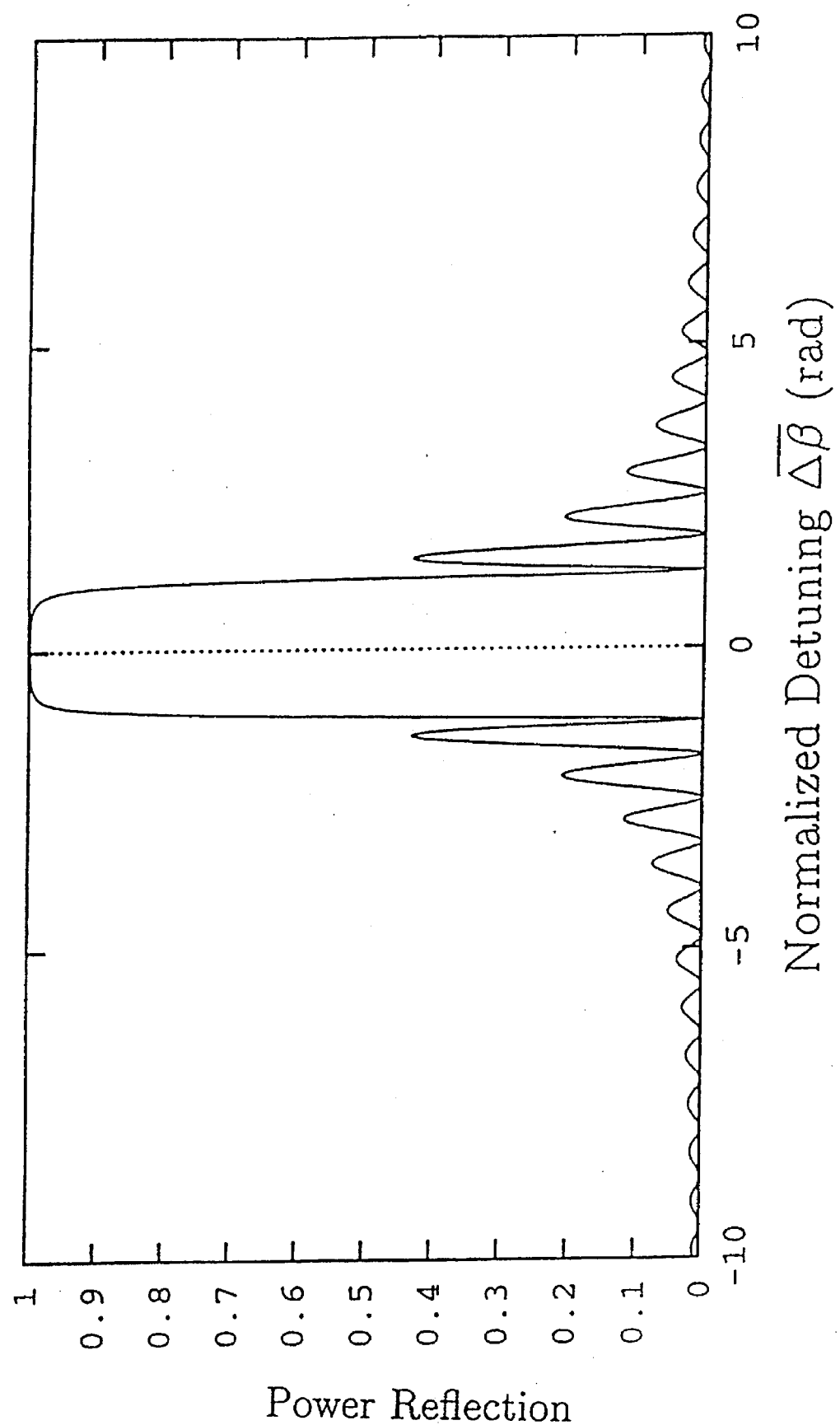
FIGS. 7a and 7b show the spectral response of a typical known distributed feedback reflection filter.
Figure 7B:
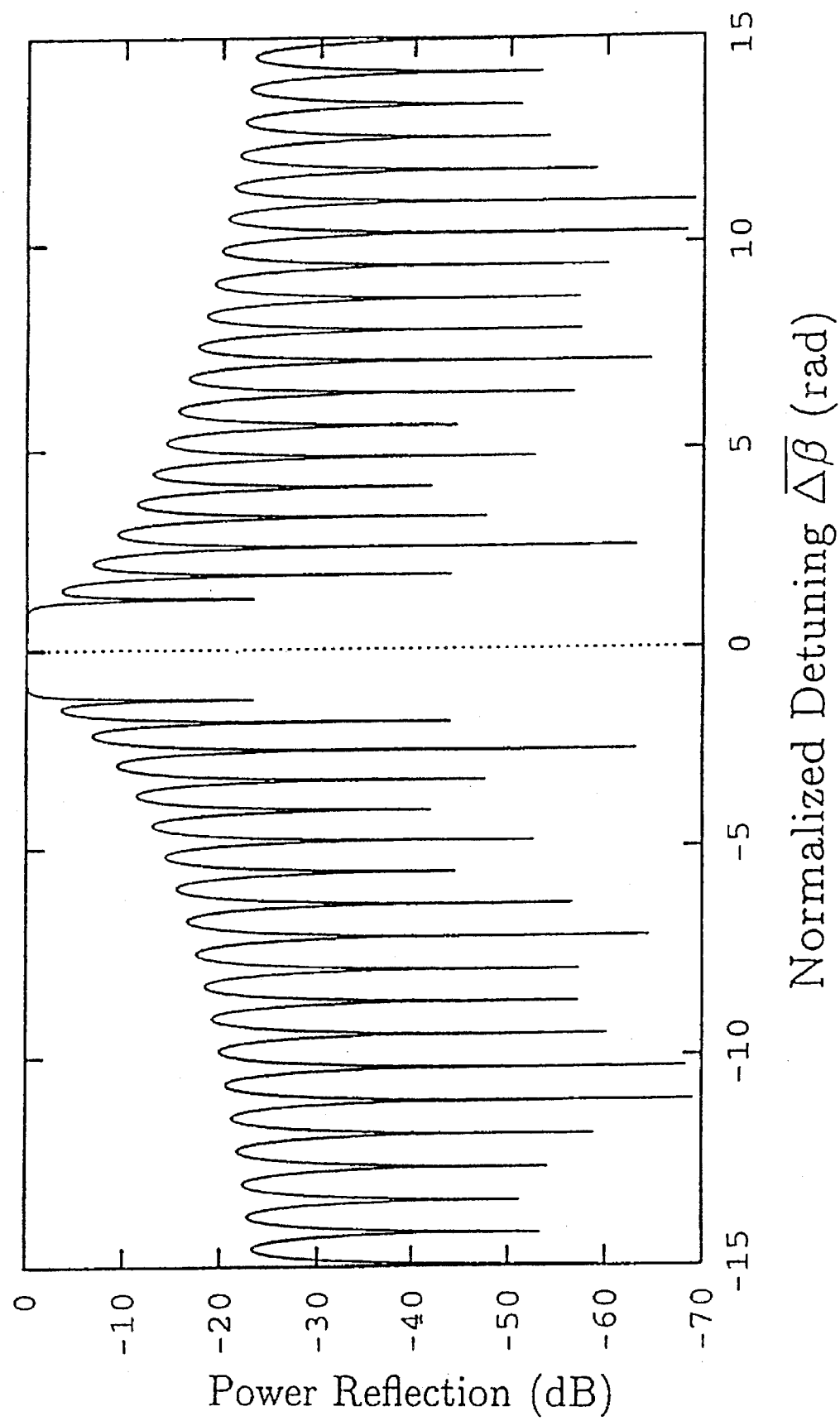
Figure 9A:
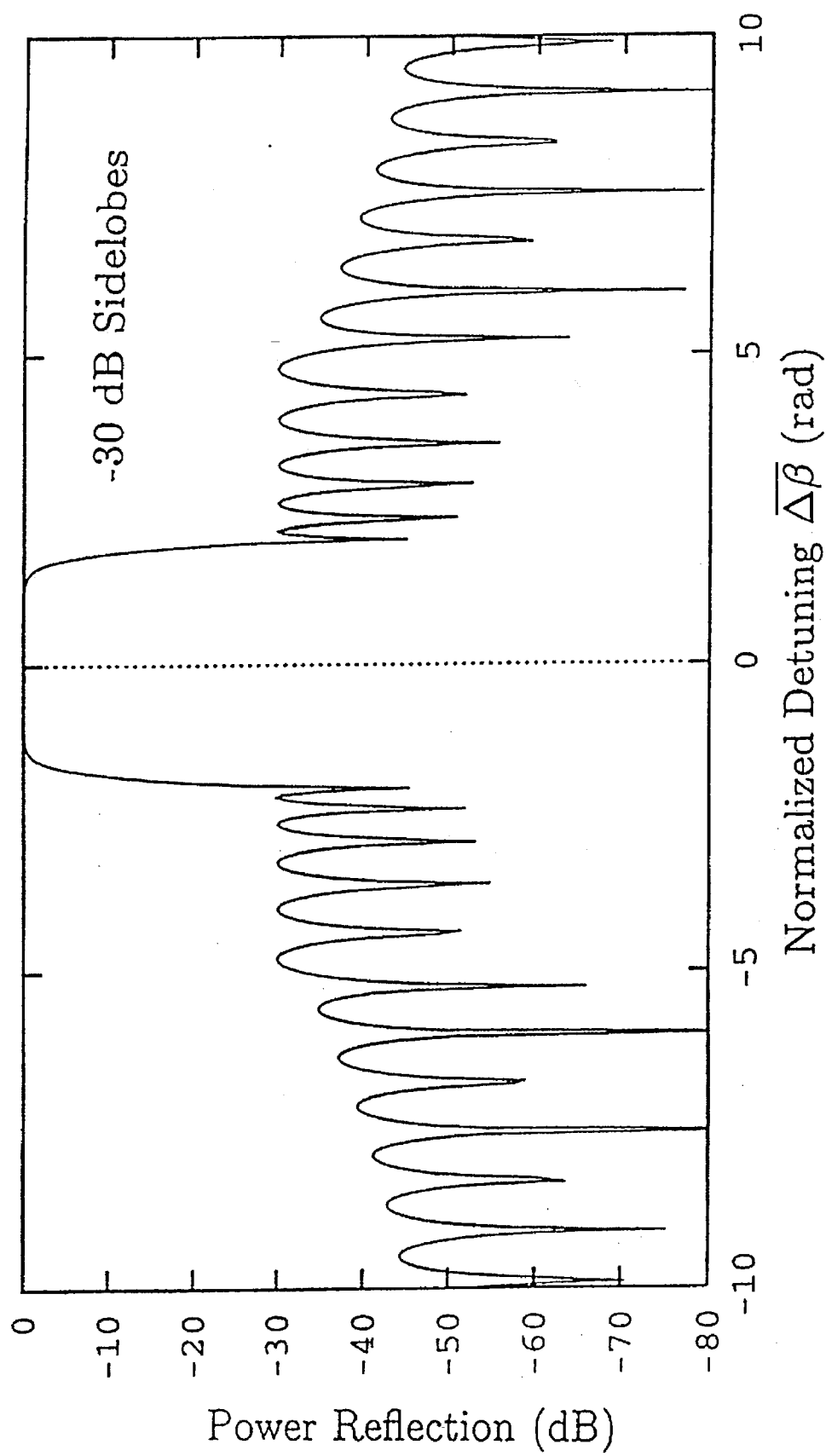
FIGS. 9a to 9d show the spectral response of the optimum taper shape functions $\kappa_S(z)$ for reflection filters according to embodiments of the invention for the four representative cases of S=30, 40, 50 and 60.
Figure 9B:
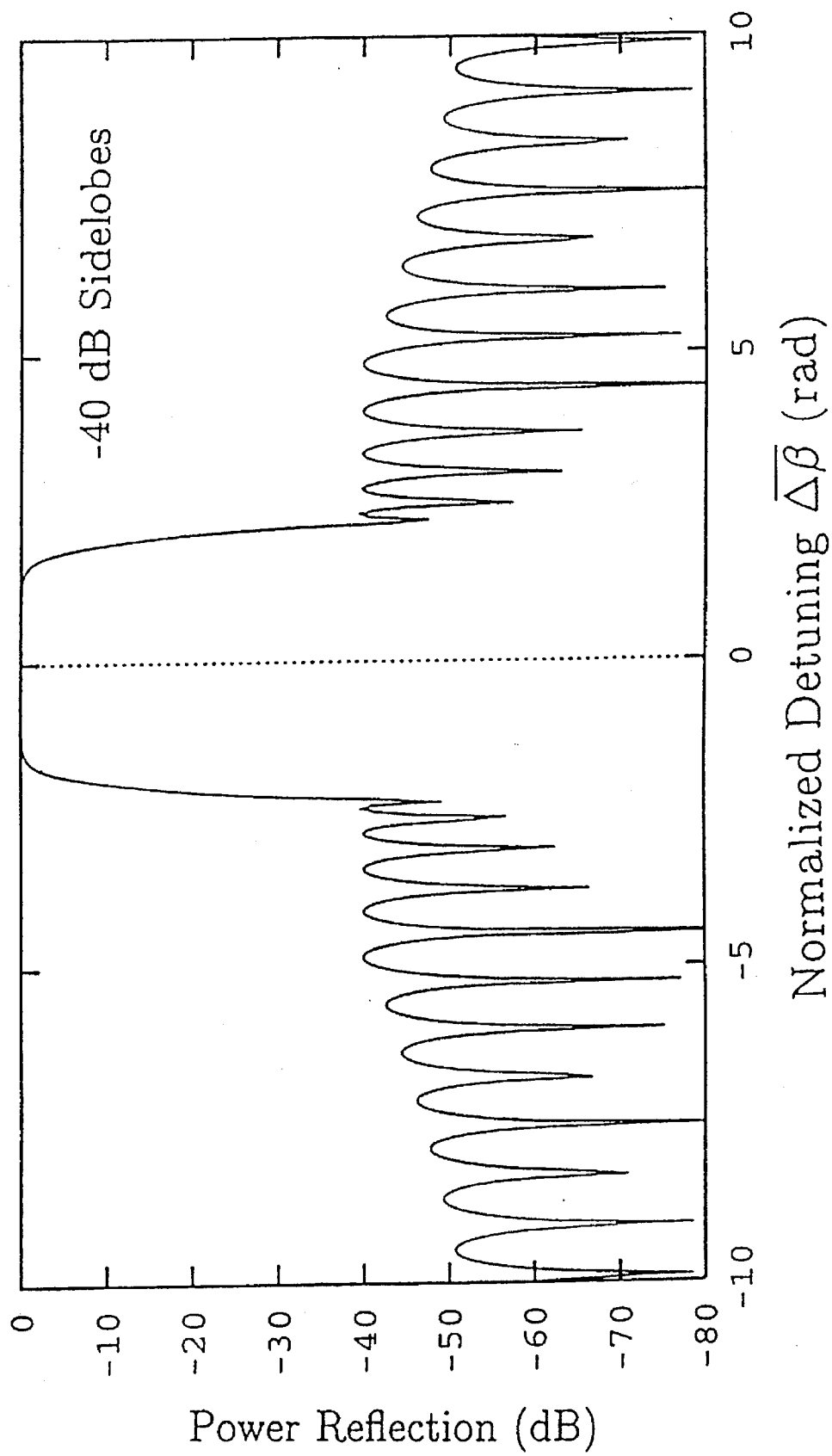
Figure 9C:
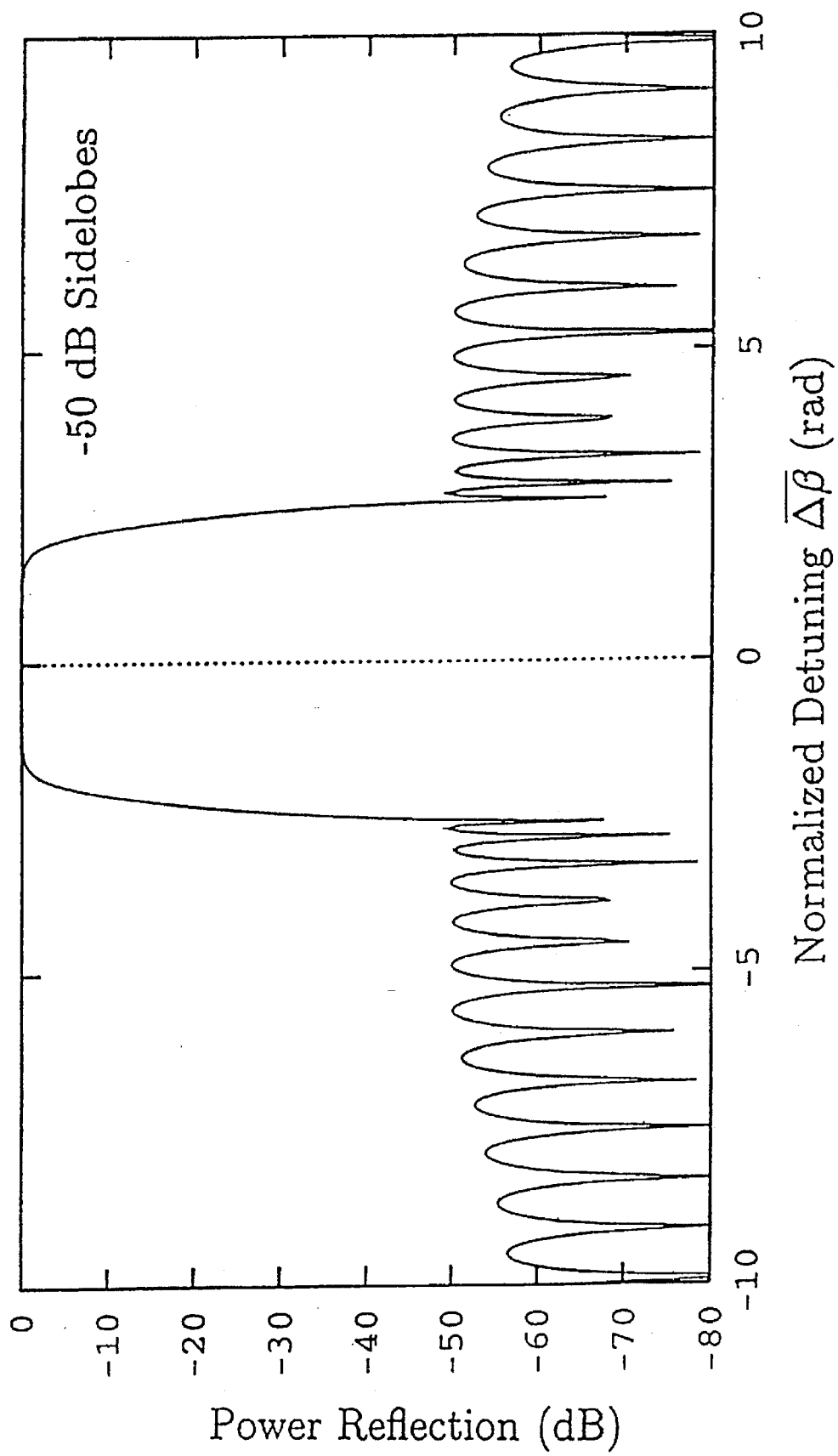
Figure 9D:
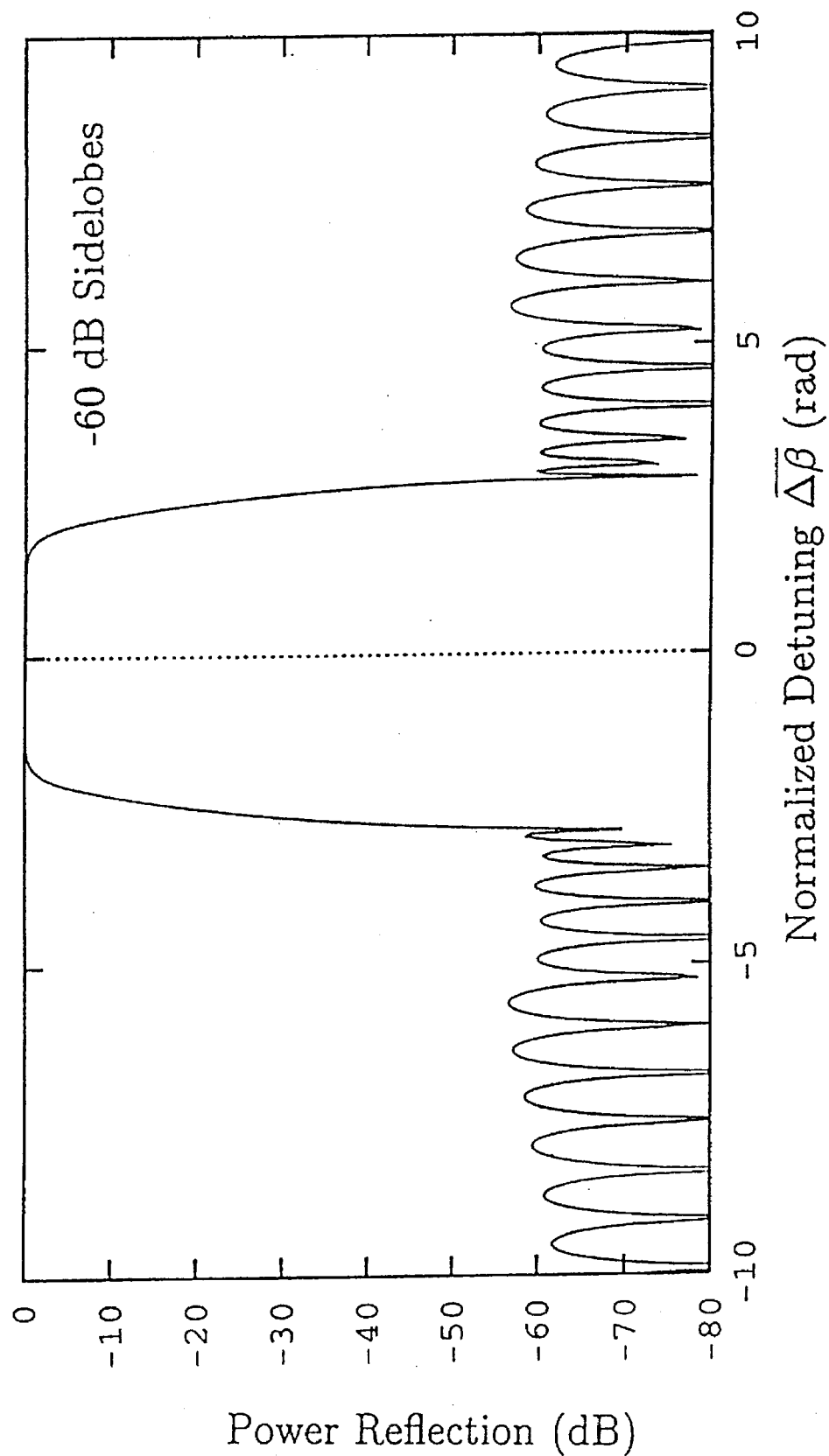

FIGS. 7a and 7b show the spectrum of a typical conventional prior art DFB coupler. FIG. 7a shows the reflected power in a linear scale to show the ideal box-like shape of the stopband, and FIG. 7b shows the reflected power in a logarithmic scale (dB), to show all the sidelobes. The ordinate is shown in units of the universal normalized detuning parameter $\Delta^-\beta$ where $$\Delta^-\beta=(\beta(\lambda)-\lambda)L_c \qquad \text{Equation (6)}$$

where $L_c$ is the length of the device. The detuning $\Delta^-\beta$ may be related to the actual wavelength $\lambda$ when the physical structure of the device is specified.

MATHEMATICAL DESCRIPTION OF COUPLING

Distributed feedback (DFB) type couplers have been modeled commonly through a set of coupled differential equations in the general form:

$$\frac{dA_F}{dz} = -jKe^{-j\Delta\beta z}A_B \qquad \text{Equation (7a)}$$

$$\frac{dA_B}{dz} = -jKe^{-j\Delta\beta z}A_F \qquad \text{Equation (7b)}$$

where $A_F$ and $A_B$ represent the amplitudes of the forward and backward travelling modes at position z, $\Delta\beta$ is the detuning constant equal to $\Delta\beta=\Delta^-\beta/L_c$, with $\Delta^-\beta$ as given in Equation (6) above, and K is the coupling strength.

The coupling strength K depends quantitatively on 3 parameters of the DFB device: (i) the total electric field of the modes in the grating region; (ii) the real physical depth and area, or an effective depth and area, of the grating modulation such as h shown in FIG. 5; (iii) the difference in refractive index values comprising the low index and high index portions of the grating (e.g. $n_1$ and $n_2$ of FIG. 5).

Given a specific device design, for example, as shown in FIG. 5, values of the coupling coefficients may be evaluated by two approaches. In the first approach, K may be calculated by a well known mathematical method known as field overlap integrals. The square of the electric field is integrated over the extent of the grating, then multiplied by factors which describe the shape and duty cycle of the grating.

Alternatively by numerically solving the coupled equations, and plotting the mode amplitude $A_B$ as a function of z, the value of K may be extracted.

However, as shown in FIG. 7, if K is constant throughout the device, there are large sidelobes and the largest one has a value of about −4 dB, which would represent significant cross talk, requiring spacing between adjacent channels in the wavelength domain much larger than the main passband width. As discussed above varying K(z) in a prescribed way along the length of the coupler can improve filter response. Practically, in a DFB reflection filter coupler, one of the three parameters of the DFB device noted above may be manipulated to modify K(z). In other branches of optics and physics this process is known as "apodization". In waveguide theory it is commonly referred to as "tapering".

THEORETICAL DERIVATION

In the following section, the application of a variational optimization method that can generate the required coupling strength shape K(z) for any type of (passive) spectral response $A_B(\Delta\beta)$ in DFB filters is described.

The method of variational optimization is used to produce the desired result. The method has been developed by the present inventors for synthesis of wavelength filter with very low sidelobes as described in copending U.S. patent application Ser. No. 08/385,419, and as discussed by the inventors in the Optics Letters, vol. 20(11), pp. 1259–1261, 1 Jun. 1995. Here the method is developed for DFB filters, to yield a spectral response with both low sidelobes and flat passband. In particular, the desired taper function is required to meet criteria to provide for a DFB reflection filter coupler giving a flat near unity transmission over the passband and sidelobe levels outside the passband suppressed to below −30 dB, and preferably to below −60 dB. The filter response is also required to have a minimum possible bandwidth achievable at the desired sidelobe suppression level.

The problem is solved for a normalized coupler, which is a coupler of unit length. Any coupler of arbitrary length can be constructed from the normalized solution, by a straightforward scaling law, as will be shown below.

For theoretical purposes, the variational optimization method begins by assuming some non-ideal coupler shape $K_o(z)$ as an initial taper shape. For example, this initial shape may be a known taper shape. The following vector function is defined:

$$E(\kappa) = [\epsilon(\kappa_o), \epsilon(\kappa_o), \ldots, \epsilon_m(\kappa_o),] \quad \text{Equation (8)}$$

The component $\epsilon_i, \{i=1 \ldots m\}$ describes the error between the desired sidelobe level and the current sidelobe level for shape $K_o$ and sidelobe i.

Algebraically, $\epsilon_i = (\sigma_i - \rho_i)$ where $\sigma_i$ is the desired sidelobe level for sidelobe i, and $\rho_i$ is the current level for sidelobe i. The total number of points m may be arbitrarily chosen to cover the wavelength range of interest.

The arbitrary coupling coefficient is represented as $$K(z) = \Sigma^N a_n f_n(z),$$

where the $f_n$ is an arbitrary set of functions. The unknowns are the coefficients $a_n$ which are written in a vector, $\vec{\kappa} = (a_1, a_2, \ldots a_N)$. Given an initial state $\vec{\kappa}_0$, an improvement to $\vec{\kappa}_0$ denoted by $\vec{\kappa}^* = \vec{\kappa}_o + \Delta\vec{\kappa}$ is found by evaluating the incremental improvement vector $\Delta\vec{\kappa}$, $$\Delta\vec{\kappa} = \alpha J^T (JJ^T)^{-1} E(\vec{\kappa}_0) \quad \text{Equation (9)}$$

where $J_{ij} = \partial\epsilon_i/\partial k_j$ is the Jacobi matrix, and $\alpha$ is a scaling parameter used to decelerate the convergence. Equation (9) is repeatedly applied until a satisfactory optimization is achieved. Hence the optimum value is analytically given by the function:

$$K(z) = \Sigma a_n f_n(z).$$

Achieving the desired sidelobe level is the first criteria in filter synthesis. The second is to obtain the narrowest bandwidth while still maintaining the maximum tolerable sidelobe level.

Thus, defining the coupler bandwidth B, as a function of the levels of all sidelobes $B = B(s_1, s_2, s_3, \ldots)$ where $s_j$ is the absolute value of sidelobe j. The gradient of B with respect to vector $\vec{S} = (s_1, s_2, s_3, \ldots)$ is then evaluated:

$$\vec{W}(\vec{s}) = \nabla_s B = \left( \frac{\partial B}{\partial s_1}, \frac{\partial B}{\partial s_2}, \ldots \right) \quad \text{Equation (10)}$$

$\vec{W}(\vec{s})$ is numerically shown to be positive definite, indicating that decreasing any sidelobe has the effect of increasing the bandwidth B. Hence for a desired maximum sidelobe level $\chi$, all sidelobes must be below $\chi$ by definition, but to achieve the minimum bandwidth they should only be infinitesimally below $\chi$. This condition provides filters that are designed to have near theoretical optimum performance.

OPTIMUM COUPLER SHAPES

Using the method outlined in equations set out above, an optimum taper function $K_S(z)$ has been synthesized for a DFB reflection filter with a specific level S of sidelobe suppression. The criteria for the design formula were to provide the shape of the coupling strength required to obtain a desired sidelobe suppression level anywhere in the range from −30 dB to −60 dB, and that the shapes so specified also produce the near minimum stopband widths which are theoretically possible for the specified sidelobe suppression level.

These filter characteristics were determined by specifying the interaction strength reflection function along the length of the coupler, by the design formula $$K_S(z) = L_o(z) + SL_1(z) + S^2 L_2(z) + S^3 L_3(z) \quad \text{Equation (11)}$$

where $K_S(z)$ is the interaction strength

S is the desired sidelobe level in |dB|, $K_S(z)$ is the interaction strength

S is the desired sidelobe level in |dB|, $L_i(z)$ (i=0,1,2,3) are functions of the propagation distance z.

The functions $L_i(z)$ are given by:

$$L_i(z) = \frac{4}{L_c} \sum_{j=1}^{6} b_{i,j} \cos\left( (2j-1)\pi \frac{z}{L_c} \right). \quad \text{Equation (12)}$$

where $L_c$ is the physical length of the coupler, and the set of constant coefficients $b_{i,j}$ are given in Table 1, below.

TABLE 1

| $b_{i,j}$ | 1 | 2 | 3 | 4 | 5 | 6 |
|---|---|---|---|---|---|---|
| $b_{0,j}$ | 1.316 | −0.4430 | 2.839e-1 | −1.902e-1 | 1.337e-1 | −9.33e-2 |
| $b_{1,j}$ | 1.308e-2 | 1.906e-2 | −1.778e-2 | 1.229e-2 | −8.188e-3 | 5.436e-3 |
| $b_{2,j}$ | −1.540e-4 | −1.136e-4 | 2.736e-4 | −2.359e-4 | 1.615e-4 | −1.048e-4 |
| $b_{3,j}$ | 7.10e-7 | 1.541e-7 | −1.397e-6 | 1.414e-6 | 1.0279e-6 | 6.680e-7 |

The functions $K_S(z)$ of Equation (11) specify the shape of the interaction as a function of propagation distance z. z is given in same units as $L_c$ which is typically μm or mm. The coefficients $b_{i,j}$ provide an optimized filter response as shown in the following figures.

Four representative examples of these optimum shapes $K_S(z)$ are plotted as normalized functions in FIG. 8. The optimum shapes are shown for sidelobe suppression levels of S=30, 40, 50, 60, as marked 8 where S represents the suppression level in dB. The ordinate in FIG. 8 is the normalized distance $z4/L_c$ where z is the physical distance and $L_o$ is the coupler length. The coupler is centered on z=0. The abscissa is shown as the normalized coupling strength $K_S L_c/4$. The corresponding normalized spectral response for the taper shapes $K_S(z)$ given in FIG. 8 are shown in FIGS. 9a, 9b, 9c and 9d, for the cases of S=30 dB, 40 dB, 50 dB, 60 dB respectively. The ordinate $\Delta^-\beta$ is the universal normalized detuning of radians (rad), see equation (6).

Figure 10A:
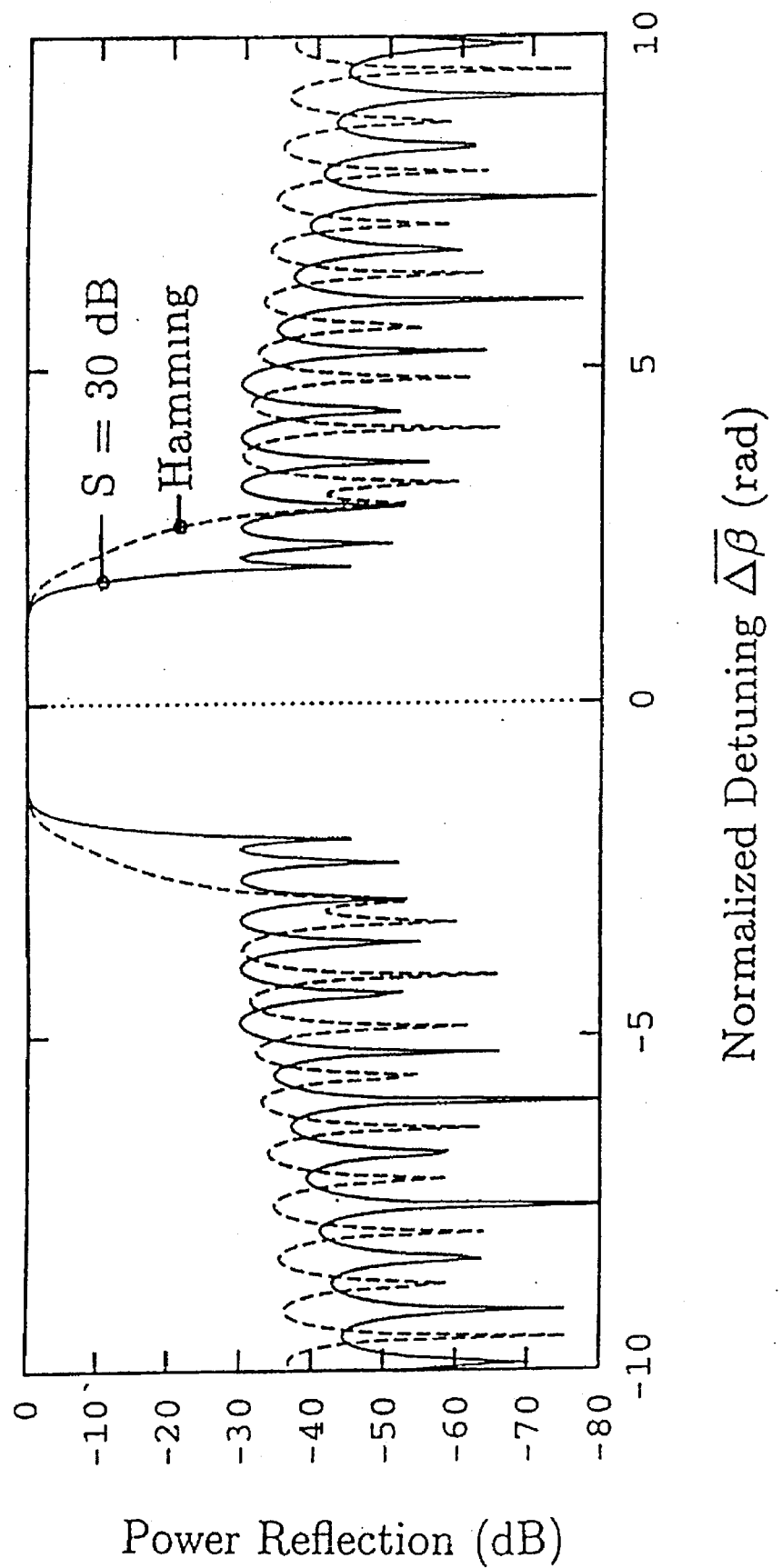
FIGS. 10a, 10b and 10c each show a comparison of the optimum spectral response using the taper functions $\kappa_S(z)$ of the present invention for a specified sidelobe suppression level (solid line), compared with a known taper function (dashed line).
Figure 10B:
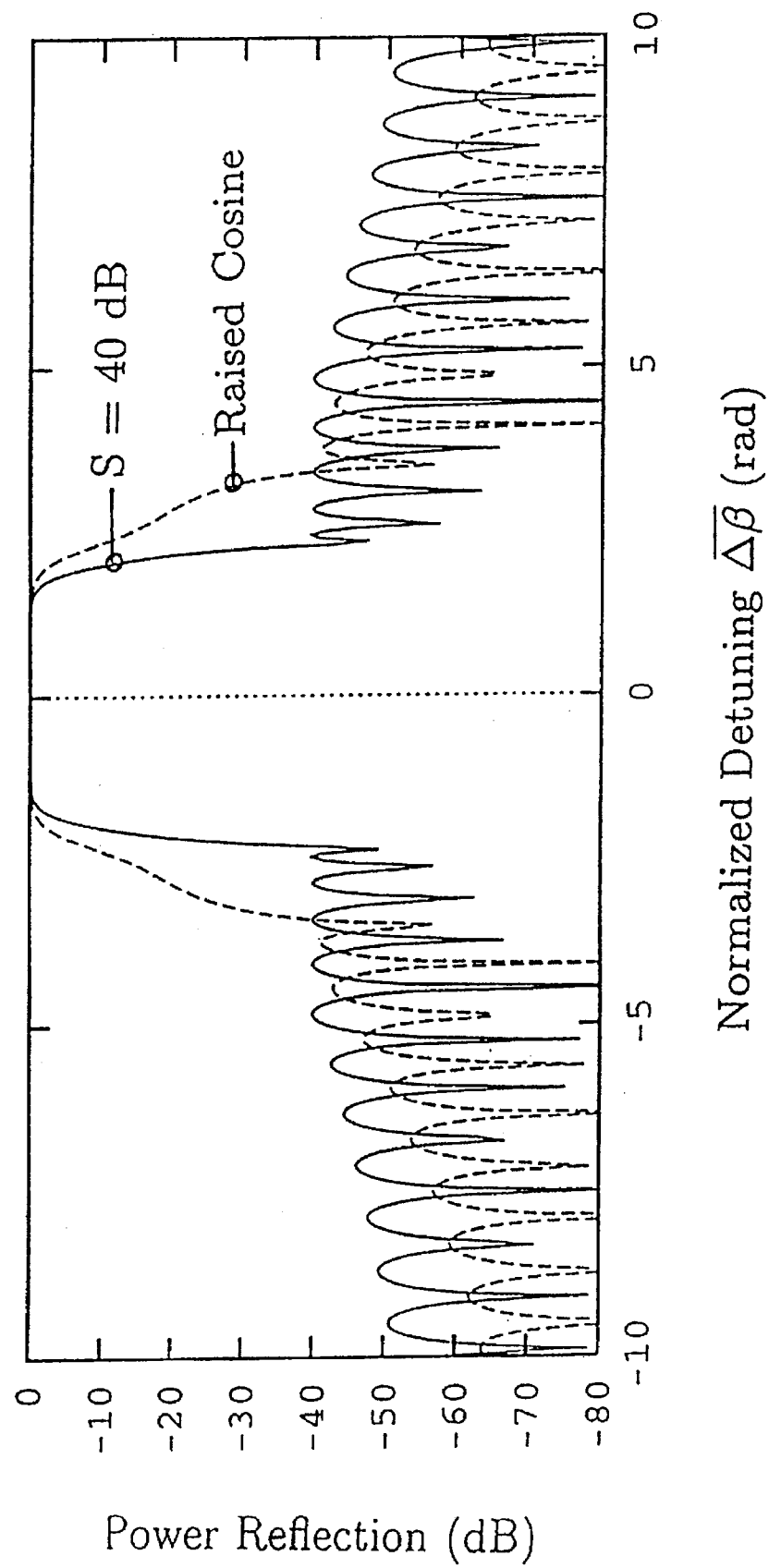
Figure 10C:
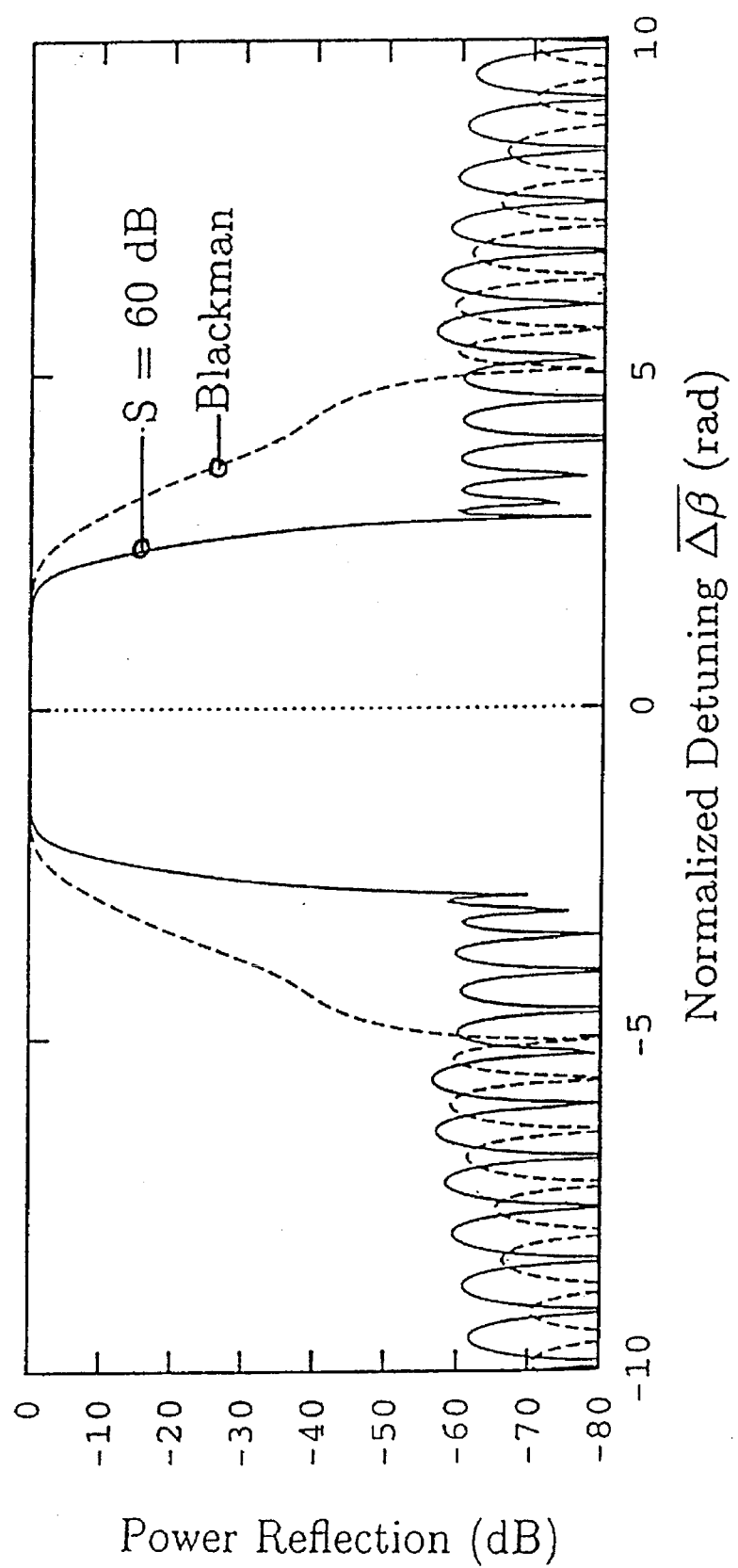

FIGS. 10a, 10b, and 10c make a comparison between the spectral response for DFB filters designed the formula (11) above, and three other known taper functions giving similar levels of sidelobe suppression.

FIG. 10a compares the spectral response of a DFB filter designed with the optimum taper function for S=30, i.e. $K_{30}$ (solid curve), with a DFB filter based on the so called Hamming function, which gives comparable sidelobe suppression of near –30 dB (dashed curve).

FIG. 10b compares the spectral response of a DFB filter designed with the optimum taper function for S=40, $K_{40}$, (solid curve) and a known raised cosine taper function which gives sidelobe suppression level of near –40 dB (dashed curve).

FIG. 10c compares the spectral response of a DFB filter designed with the optimum taper function $K_{60}$ (solid curve) and a Blackman taper function, which gives sidelobe suppression of near –60 dB (dashed curve). Thus FIGS. 10a, 10b and 10c all show clearly the superiority of the newly developed function $K_S(z)$ in minimizing bandwidth for any particular desired level of sidelobe suppression. All other known taper functions provide DFB filters having a spectral response with a slower roll off of the stop band, which wastes a significant portion of the optical bandwidth.

Figure 11:
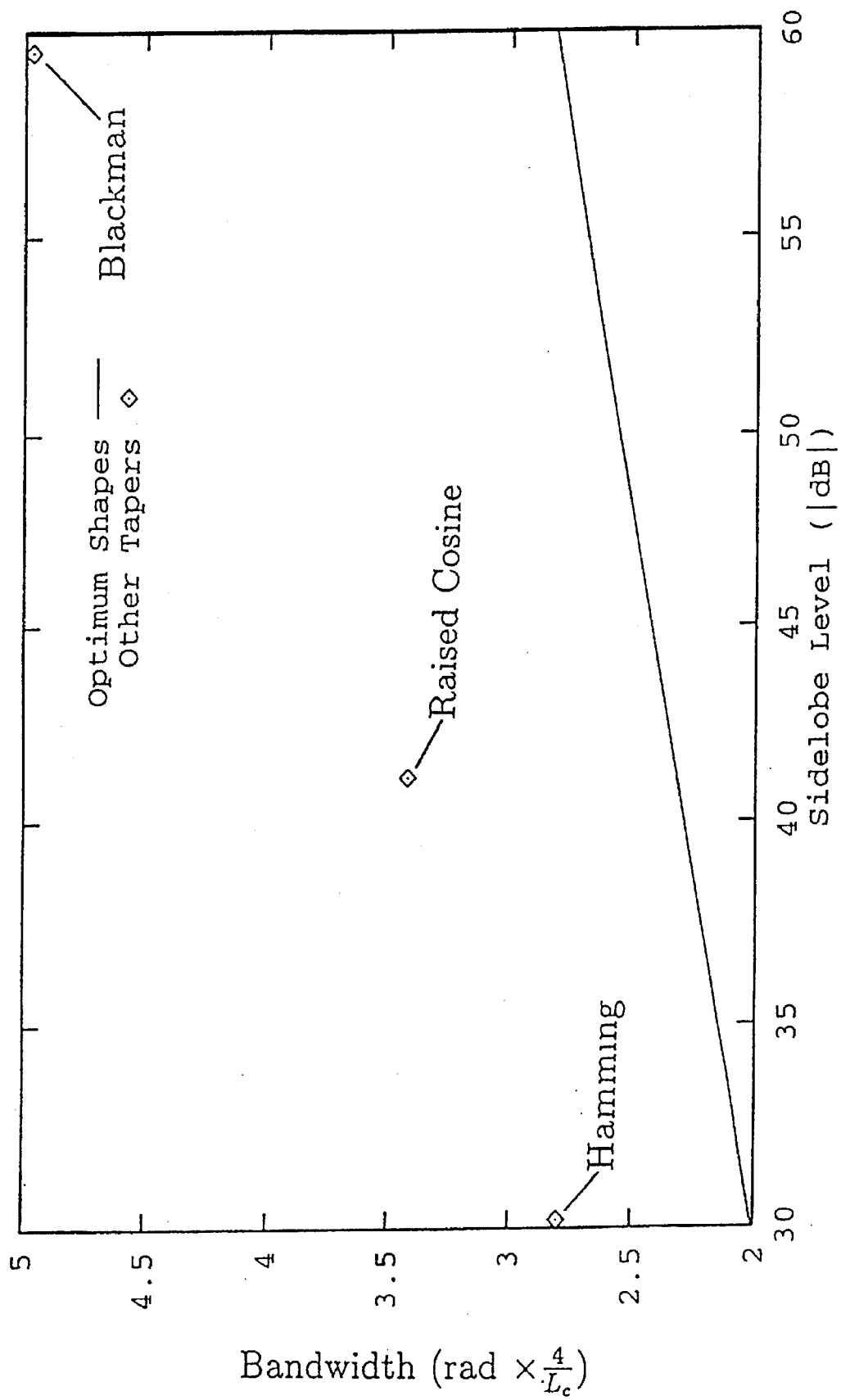
FIG. 11 shows a comparison of the bandwidth obtainable as a function of specified sidelobe suppression level for the Hamming, raised cosine and Blackman taper functions, in comparison with the optimum taper shape $\kappa_S(z)$ of the present invention.

The general performance of couplers designed by Equation (11) is summarized in FIG. 11. In FIG. 11 the stopband width at the desired level of sidelobe suppression is plotted against the sidelobe level. The solid curve represents the spectral response of DFB couplers designed by Equation (11) and which are near the theoretical optimum. A filter cannot be designed to have a response that lies below the line in FIG. 11, which represents the minimum passband for a desired sidelobe suppression.

For comparison the performance of other known taper shapes are provided as labelled points, (i.e. for Blackman, Hamming and raised cosine taper functions.)

It will be clear that in practical implementation of DFB couplers, very small variations in the set of constant coefficients $b_{i,j}$ may be tolerated and provide filters with slightly less than optimum response, which are nevertheless satisfactory.

PRACTICAL IMPLEMENTATIONS OF THE COUPLING STRENGTH TAPERING

The optimized taper function of equations (11) and (12) shows how the interaction strength should be modulated along the propagation direction z. The magnitude of $K_S(z)$ depends on three physical factors: a). the total electric field within the grating region; b). the actual or effective size of the grating region; c). the difference in the refractive index values which make up the low index and high index portions of the grating.

In order to manipulate the magnitude of $K_S(z)$ some parameter of the device must be varied, in order to effect a change in one of the parameters a) to c). These following device parameters modulated to provide the desired interaction strength.

Figure 12A:
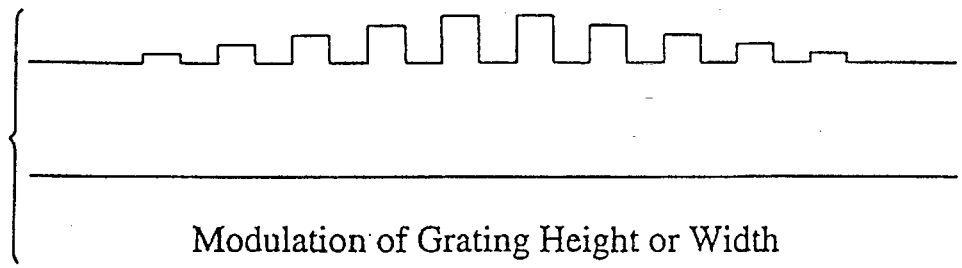
FIG. 12a, 12b, 12c to 12d shows schematically four methods for varying the coupling strength by manipulating the physical parameters of gratings of DFB reflection filter couplers.

(i) the vertical height of the grating:

In filter structures represented by the structures of FIG. 12a and FIG. 4b, for example the coupling strength is proportional to the reflections in the grating region. A deeper grating causes increased reflections and increased interaction of the electric filed with the grating. The taper function can thus be modulated as shown schematically in FIG. 12a to provide the required interaction strength along the length of the grating.

(ii) the horizontal width of the grating:

In filter structures represented by FIGS. 12a and 4d, for example, modulating the horizontal depth of the grating thus changes the amount of reflection and hence modulates the interaction strength in a manner similar to modulation of the vertical height of the grating.

Figure 12B:
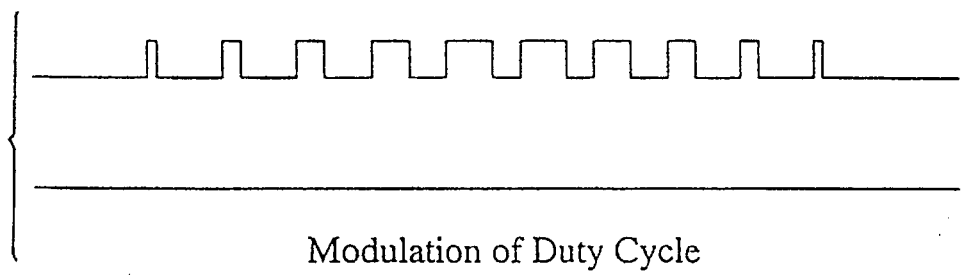
Figure 12C:
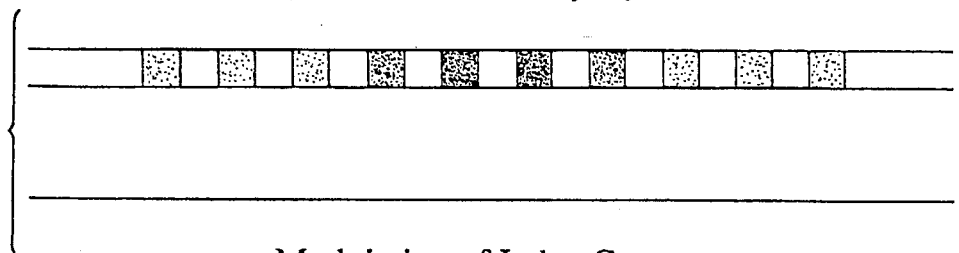

(iii) the duty cycle of the grating:

A rectangular grating shape is fundamentally composed of sinusoidal shapes or harmonics, in terms of a Fourier series. Only the first sinusoidal harmonics contribute to synchronous coupling between two interacting modes. The magnitude of the first harmonic depends on the duty cycle of the grating through its Fourier series. Modulation of the duty cycle, i.e. the tooth width of the grating, as shown schematically in FIG. 12b, thus modulates the "effective height" of the grating, as in case (i) above.

(iv) the index contrast of the grating:

The coupling in a grating occurs because of coherent reflections from the periodic grating structure which results from index contrast, for example, by varying doping concentration or material composition of the grating, in fabrication of the waveguides. The strength of these reflections is determined by the size of the grating, and the index difference, or contrast, of the two index values making up the grating.

(v) adjusting the average coupling strength through sampled grating modulation.

Figure 12D:
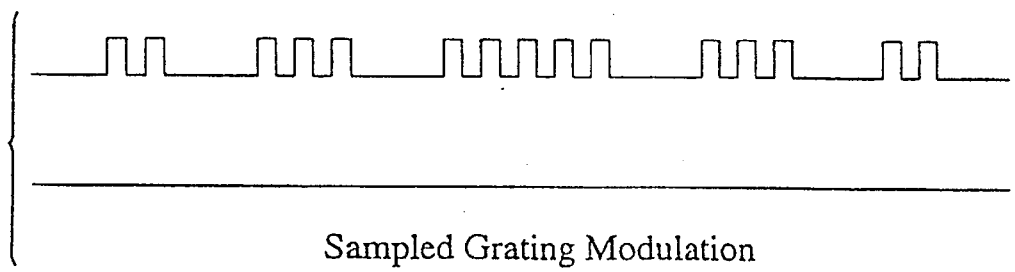

As shown in FIG. 12d, the average coupling strength over a certain length range may be varied by turning some gratings off, i.e. removing grating teeth to modulate the effective coupling strength.

To implement one of the five method of modulating parameter to define the required coupling strength, $K_S(z)$, one needs to know how $K_S(z)$ changes with a change in the chosen design parameter, which will be called p, for example, the grating width.

Given $K_S(z)$, p may be calculated by a mathematical method, known as field overlap integrals, a well known method described extensively in the literature, as described for example by H. Kogelnik in "Filter response of non uniform almost periodic structures" Bell Sys. Tech. J. vol. 55, pp. 109–127 (1976). In this method, the square of the electric field is integrated over the extent of the grating, and then multiplied by factors which describe the shape and duty cycle of the grating.

Alternatively equations 1a and 1b, describing power transfer, admit to analytic solutions when the coupling coefficient K is kept constant. The total reflected power in this case varies as $\tanh^2(K*L_c)$. Thus by measuring the reflected power as a function of p for a services of devices, one may extract the corresponding value of K. The value of K may be plotted as a function of p on a graph. Curve fitting of the points on the graph provide an analytic formula for the variation of K with p. Thus the parameter p of the device structure is thus appropriately varied during fabrication of the DFB filter, to provide the required $K_S(z)$.

In all of the foregoing implementation methods, it is important to insure that at the central wavelength $\lambda_o$, the grating period matches the propagation constant of the modes. That is $$\Lambda = \frac{\pi}{\beta(\lambda_o)}$$

where $\beta$ is the propagation constants of the guided modes. The propagation constants may change along the length of the device, that is $\beta(\lambda_o) \rightarrow \beta(\lambda_o, z)$, due to the change in physical parameters necessary to modulate $K_S$. In this case, the period $\Lambda$ should also be varied along the devices that at all points $$\Lambda(z) = \frac{\pi}{\beta(\lambda_o, Z)}$$

The practical embodiments of the invention may be implemented in DFB reflection filter couplers fabricated by known methods from III–V, II–VI alloy compounds as well as a Si/Ge alloy system. The configurations are also applicable for silica, glass, polymer and photo-refractive materials such as lithium niobate. As illustrated by the structures shown in the Figures, both vertical and lateral coupling are contemplated.

Waveguides may optionally be provided with electrode means to effect electro-optic tuning of devices.

Thus while particular embodiments are described in detail, many variations and modifications of these embodiments fall within the scope of the following claims.

What is claimed is:

1. A distributed feedback optical reflection filter coupler wherein the interaction strength reflection function along the length z of the coupler, is specified by the design:

$$K_S(z) = L_o(z) + SL_1(z) + S^2 L_2(z) + S^3 L_3(z)$$

where $K_S(z)$ is the normalized interaction strength along the propagation direction, S is the desired sidelobe level in |dB|, $L_i(z)$ (i=0,1,2,3) are functions of the propagation distance z, and the functions $L_i(z)$ are given by $$L_i(z) = \frac{4}{L_c} \sum_{j=1}^{6} b_{i,j} \cos\left( (2j-1)\pi \frac{z}{L_c} \right).$$

where $L_c$ is the physical length of the coupler, and the set of constant coefficients $b_{i,j}$ are given by

|  | j | | | |
|---|---|---|---|---|
| $b_{i,j}$ | 1 | 2 | 3 | 4 |
| $b_{0,j}$ | 1.316 | −0.4430 | 2.839e-1 | −1.902e-1 |
| $b_{1,j}$ | 1.308e-2 | 1.906e-2 | −1.778e-2 | 1.229e-2 |
| $b_{2,j}$ | −1.540e-4 | −1.136e-4 | 2.736e-4 | −2.359e-4 |
| $b_{3,j}$ | 7.10e-7 | 1.541e-7 | −1.397e-6 | 1.414e-6 |

|  | j | |
|---|---|---|
| $b_{i,j}$ | 5 | 6 |
| $b_{0,j}$ | 1.337e-1 | −9.33e-2 |
| $b_{1,j}$ | −8.188e-3 | 5.436e-3 |
| $b_{2,j}$ | 1.615e-4 | −1.048e-4 |
| $b_{3,j}$ | 1.0279e-6 | 6.680e-7 |

2. A DFB optical reflection filter coupler according to claim 1 wherein the filter comprises a reflection grating having a vertically corrugation depth, and the specified interaction strength $K_S(z)$ is produced by modulation of the vertical corrugation depth of the reflection grating.

3. A DFB optical reflection filter coupler according to claim 1 wherein the filter comprises a reflection grating having a horizontal corrugation width, and the specified interaction strength $K_S(z)$ is produced by modulation of the corrugation width of the reflection grating.

4. A DFB optical reflection filter coupler according to claim 1 wherein the filter comprises a reflection grating wherein the modulation of the duty cycle duty cycle provides the specified interaction strength $K_S(z)$.

5. A DFB optical reflection filter coupler according to claim 1 comprising a grating with a on-off sample rate of the grating corrugations defined to provided the specified interaction strength $K_S(z)$.

6. A DFB optical reflection filter coupler according to claim 1 comprising an index modulation grating having high index and low index regions, and wherein the modulation of the high and low index contrast provides the specified interaction strength $K_S(z)$.

7. A distributed feedback optical reflection filter coupler comprising a grating structure, wherein a physical parameter of the grating structure is modulated along a propagation direction to define an interaction strength, and wherein the taper shapes determining the interaction strength as a function of propagation distance z along the length of the coupler are determined by the design $$K_S(z) = L_o(z) + SL_1(z) + S^2 L_2(z) + S^3 L_3(z)$$

where $K_S(z)$ is the interaction strength as a function of the propagation distance z, S is the specified sidelobe level in |dB|, and $L_o(z) \ldots L_3(z)$ are functions of the propagation distance z, to provide an interaction strength reflection function having an out-of-band sidelobe suppression ratio of greater than −30 dB, and a minimum width of the filtered bandwidth for a specified side lobe suppression level.

8. The distributed feedback optical reflection filter coupler of claim 7, wherein the function $L_o(z)$ to $L_3(z)$ are given by $$L_i(z) = \frac{4}{L_c} \sum_{j=1}^{6} b_{i,j} \cos\left( (2j-1)\pi \frac{z}{L_c} \right)$$

where:

$L_c$ is the physical length of the coupler, z is the propagation distance along the coupler, and the set of coefficients $b_{i,j}$ are optimized, to provide an interaction strength reflection function having an out-of-band sidelobe suppression ratio of greater than −30 dB, and a minimum width of the filtered bandwidth for a specified side lobe suppression level.

* * * * *